(12) United States Patent
Shirley, Jr. et al.

(10) Patent No.: US 11,040,920 B2
(45) Date of Patent: Jun. 22, 2021

(54) FERTILIZER AND PLANT GROWTH PROMOTER TO INCREASE PLANT YIELD AND METHOD OF INCREASING PLANT YIELD

(71) Applicant: Innovations for World Nutrition, LLC, Florence, AL (US)

(72) Inventors: Arthur R. Shirley, Jr., Florence, AL (US); Melissa C. Hayes, Florence, AL (US); Timothy G. Holt, Florence, AL (US)

(73) Assignee: INNOVATIONS FOR WORLD NUTRITION LLC, Florence, AL (US)

( * ) Notice: Subject to any disclaimer, the term of this patent is extended or adjusted under 35 U.S.C. 154(b) by 204 days.

(21) Appl. No.: 16/215,396

(22) Filed: Dec. 10, 2018

(65) Prior Publication Data

US 2019/0185390 A1 Jun. 20, 2019

Related U.S. Application Data

(60) Provisional application No. 62/599,491, filed on Dec. 15, 2017.

(51) Int. Cl.
*C05G 3/90* (2020.01)
*C05F 11/00* (2006.01)
(Continued)

(52) U.S. Cl.
CPC .................. *C05G 3/90* (2020.02); *C05B 1/02* (2013.01); *C05B 7/00* (2013.01); *C05B 17/00* (2013.01);
(Continued)

(58) Field of Classification Search
CPC .......... C05G 3/08; C05G 1/00; C05G 3/0041; C05G 3/04; C05F 11/00; C05C 11/00;
(Continued)

(56) References Cited

U.S. PATENT DOCUMENTS 1,870,131 A 8/1932 Meier
3,197,302 A 7/1965 MacBride
(Continued)

FOREIGN PATENT DOCUMENTS

BR 409658 4/1934
BR 1287749 6/1972
(Continued)

OTHER PUBLICATIONS

Eggum, Bjø Rn O., and Bienvenido O. Juliano. "Higher protein content from nitrogen fertiliser application and nutritive value of milled-rice protein." Journal of the Science of Food and Agriculture 26.4 (1975): 425-427.*

(Continued)

*Primary Examiner* — Jennifer A Smith
(74) *Attorney, Agent, or Firm* — Jeffrey S. Melcher; Melcher Patent Law PLLC

(57) ABSTRACT

A slow release carbohydrate/bicarbonate/nitrogen fertilizer which includes: a nitrogen component selected from the group consisting of a urea compound, ammonium bicarbonate, ammonium sulfate and ammonium nitrate; a bicarbonate component selected from the group consisting of ammonium bicarbonate, potassium bicarbonate and sodium bicarbonate; and a soluble carbohydrate component selected from the group consisting of a starch and a sugar, wherein the fertilizer is applied to increase crop yield and increase protein levels in plant products by placing the aforesaid fertilizer beneath the surface of soil on which is growing cultivated plants.

35 Claims, 4 Drawing Sheets

(51) Int. Cl.
*C05G 3/80* (2020.01)
*C05G 5/30* (2020.01)
*C05B 1/02* (2006.01)
*C05B 7/00* (2006.01)
*C05B 17/00* (2006.01)
*C05C 9/00* (2006.01)
*C05C 11/00* (2006.01)
*C05G 1/00* (2006.01)

(52) U.S. Cl.
CPC ............ *C05C 9/00* (2013.01); *C05C 11/00* (2013.01); *C05F 11/00* (2013.01); *C05G 1/00* (2013.01); *C05G 3/80* (2020.02); *C05G 5/30* (2020.02)

(58) Field of Classification Search
CPC .. C05C 9/00; C05B 7/00; C05B 17/00; C05B 1/02
See application file for complete search history.

(56) References Cited

U.S. PATENT DOCUMENTS

| | | | |
|---|---|---|---|
| 3,506,432 | A | 4/1970 | Arita |
| 4,026,695 | A | 5/1977 | Young |
| 4,559,076 | A | 12/1985 | Young |
| 4,571,256 | A | 2/1986 | Takagi |
| 5,044,117 | A | 9/1991 | Kuckens |
| 5,308,373 | A | 5/1994 | Moore |
| 5,338,551 | A | 8/1994 | Lajoie |
| 5,432,148 | A | 7/1995 | Winston |
| 5,443,835 | A | 8/1995 | Winston |
| 5,468,715 | A | 11/1995 | Joseph |
| 5,741,521 | A | 4/1998 | Knight |
| 5,849,060 | A | 12/1998 | Diping |
| 5,876,990 | A | 3/1999 | Reddy |
| 6,101,763 | A | 8/2000 | Aoki |
| 6,231,633 | B1 | 5/2001 | Hirano |
| 6,358,294 | B1 | 3/2002 | Latting |
| 6,387,145 | B1 | 5/2002 | Miele |
| 6,475,257 | B1 | 11/2002 | Baptist |
| 7,753,984 | B2 | 7/2010 | Liu |
| 7,776,124 | B2 | 8/2010 | Binder |
| 8,328,898 | B2 | 12/2012 | Liu |
| 8,609,145 | B2 | 12/2013 | Anderson |
| 8,883,677 | B2 | 11/2014 | Windhoevel |
| 8,940,074 | B2 | 1/2015 | Kuo |
| 8,979,970 | B2 | 3/2015 | Kucera |
| 9,174,885 | B2 | 11/2015 | Taulbee |
| 9,334,199 | B2 | 5/2016 | Kuo |
| 9,566,240 | B2 | 2/2017 | Burch |
| 9,682,894 | B2 | 6/2017 | Gabrielson |
| 2003/0061758 | A1 | 4/2003 | Wilson |
| 2004/0200248 | A1 | 10/2004 | Kirkegaard |
| 2006/0003893 | A1 | 1/2006 | Pursell |
| 2011/0113843 | A1 | 5/2011 | Mantelatto |
| 2011/0174032 | A1 | 7/2011 | Liu |
| 2012/0103039 | A1 | 5/2012 | Brucher |
| 2015/0305251 | A1 | 10/2015 | Eyres |
| 2016/0031763 | A1 | 2/2016 | Kim |
| 2016/0280613 | A1 | 9/2016 | Wickstrom |
| 2016/0332929 | A1 | 11/2016 | McKnight |
| 2017/0008812 | A1 | 1/2017 | Kim |
| 2017/0152195 | A1 | 6/2017 | Terenzio |
| 2017/0166488 | A1* | 6/2017 | Chaudhry ............ C05B 15/00 |

FOREIGN PATENT DOCUMENTS

| | | |
|---|---|---|
| CN | 1088562 | 6/1994 |
| CN | 1089932 | 7/1994 |
| CN | 1136028 | 11/1996 |
| CN | 1141276 | 1/1997 |
| CN | 1240777 A | 1/2000 |
| CN | 1296934 | 5/2001 |
| CN | 1400196 A | 3/2003 |
| CN | 1408680 A | 4/2003 |
| CN | 1122652 | 10/2003 |
| CN | 1629107 | 6/2005 |
| CN | 101157580 | 4/2008 |
| CN | 101195547 | 6/2008 |
| CN | 101781137 | 7/2010 |
| CN | 102515911 | 6/2012 |
| CN | 10278356 | 11/2012 |
| CN | 102936169 | 2/2013 |
| CN | 103304292 | 9/2013 |
| CN | 103518456 | 1/2014 |
| CN | 103539526 | 1/2014 |
| CN | 103539556 | 1/2014 |
| CN | 03570420 | 2/2014 |
| CN | 03708891 | 4/2014 |
| CN | 104045437 | 9/2014 |
| CN | 104086268 | 10/2014 |
| CN | 104262018 A * | 1/2015 |
| CN | 104496685 | 4/2015 |
| CN | 104557312 | 4/2015 |
| CN | 104591818 | 5/2015 |
| CN | 104829358 | 8/2015 |
| CN | 104829362 | 8/2015 |
| CN | 105347876 | 2/2016 |
| CN | 105948892 | 9/2016 |
| CN | 106316495 | 1/2017 |
| CN | 106316532 | 1/2017 |
| CN | 106576795 | 4/2017 |
| CN | 106747771 | 5/2017 |
| CN | 106818732 | 6/2017 |
| CN | 107235814 | 10/2017 |
| EP | 2716620 | 9/2014 |
| FR | 1520587 | 4/1968 |
| JP | 54130367 | 10/1979 |
| JP | 5626796 | 3/1981 |
| JP | H06105620 | 4/1994 |
| WO | 9627288 | 2/1996 |
| WO | 01/14285 | 3/2001 |
| WO | 2009091570 | 1/2009 |
| WO | 2014106424 | 7/2014 |
| WO | 2017068038 | 4/2017 |

OTHER PUBLICATIONS

Wikipedia: Soil Test. In Wikipedia. <https://en.wikipedia.org/wiki/Soil_test> Jul. 17, 2016.*
James, Beverly. "Pros and Cons of Granule and Liquid Fertilizers" AgPro. <https://www.agprofessional.com/article/pros-and-cons-granular-and-liquid-fertilizers> Aug. 23, 2016.*
Naipictuasdharwad. "Irrigation water management in paddy". Agropedia. <http://agropedia.iitk.ac.in/content/irrigation-water-management-paddy> Mar. 24, 2009.*
Incite Pivot Fertilizers, "Product Density and Sizing" <https://www.incitecpivotfertilisers.com.au/~/media/Files/IPF/Documents/Fact%20Sheets/2016_DensityChart.pdf> Jul. 2016.*
Mitsui, Shingo, and Kiyoshi Kurihara. "The intake and utilization of carbon by plant roots from C14-labeled urea Part I. The determination of radioactive carbon of plant materials and a preliminary seedling experiment utilizing C14-labeled urea." Soil Science and Plant Nutrition 3.1 (1957): 59-64.*
Written Opinon and International Search Report issued in corresponding PCT/US18/65373, dated Feb. 27, 2018, pp. 1-41.
Prior art search conducted Jan. 4, 2018, PatPro Inc., Taun Nguyen, pp. 1-7.
Subbaiah, S.V., et al. "Studies on yield maximization through balanced nutrient ratios in irrigated lowland rice." International Rice Commission Newsletter (FAO), 50 (2001): 59-65.
Demand for Chapter II and Response to Written Opinion filed in corresponding PCT/US18/65373, filed May 15, 2019, pp. 1-34.
International Preliminary Report on Patentability issued in PCT/US18/065373, dated Aug. 27, 2019, pp. 1-13.
Viktor. "The influence of root assimilated inorganic carbon on nitrogen acquisition/assimilation and carbon partitioning." New Phytol. 165, 1 (2005): 157-69.

(56) References Cited

OTHER PUBLICATIONS

Vuorinen. "Dark CO2 fixation by roots of willow and barley in media with a high level of inorganic carbon." Journal of Plant Physiology. vol. 151, 4 (1997): 405-408.
Hernandez. "Different Bacterial Populations Associated with the Roots and Rhizosphere of Rice Incorporate Plant-Derived Carbon." Appl Environ Microbiol. vol. 81 (2015): 2244-2253.
Bugbee. "CO2 crop growth enhancement and toxicity in wheat and rice." Adv. Space Res. vol. 14, 11 (1994): 257-267.
Razzaque. "Effects of Nitrogen Fertilizer and Elevated CO2 on Dry Matter Production and Yield of Rice Cultivars." Bangladesh J. Agril. Res. 34,2 (2009): 313-322.
Allen. "The CO2 fertilization effect: higher carbohydrate production and retention as biomass and seed yield." Global climate change and agricultural production. direct and indirect effects, Chapter 39. (1996).
Brix. "Uptake and photosynthetic utilization of sediment-derived carbon by Phragmites australis (Cav.) Trin. ex Steudel." Aquatic Botany. vol. 38, 4 (1990): 377-389.
Cannon. "On the Relation of Root Growth and Development to the Temperature and Aeration of the Soil" American Journal of Botany. vol. 2, 5 (1915): 211-224.
Chang. "Effect of Carbon Dioxide on Absorption of Water and Nutrients by Roots." Plant Physiol. vol. 20, 2 (1945): 221-232.
Cramer. "Inorganic carbon fixation and metabolism in maize roots as affected by nitrate and ammonium nutrition." Physiologia Plantarum. vol. 89, 3 (2006): 632-639.
Dilorio. "Carbon dioxide improves the growth of hairy roots cultured on solid medium and in nutrient mists." Applied Microbiology Biotechnology. vol. 37 (1992): 463-467.
Gorski. "1986: Response of eggplant solanum melogena to a root environment enriched with carbon dioxide." Hortsciencesect. vol. 1 (1986): 495-498.
Grinfield. "On the Nutrition of Plants with Carbon Dioxide through the Roots." Physiology of Plants. vol. 97, 5 (1954).
Jin. "Elevated Carbon Dioxide Improves Plant Iron Nutrition through Enhancing the Iron-Deficiency-Induced Responses under Iron-Limited Conditions in Tomato." Plant Physiology. vol. 150 (2009): 272-280.
Zahid, "A comprehensive review on biodegradable polymers and their blends used in controlled release fertilizer processes," Rev., Chem. Eng. 2015; 31(1) pp. 69-95.
Kissel, "Management of urea fertilizers," Kansas State University, 1988.
Cai, et al. "Nitrogen loss from ammonium bicarbonate and urea fertilizers applied to flooded rice," Fertilizer Research 10.3 (1986): 203-215.
Black, et al. "Effects of form of nitrogen, season, and urea application rate on ammonia volatilisation from pastures," New Zealand Journal of Agricultural Research 28.4 (1985): 469-474.
Yong Zhang, "An Eco-Friendly Slow-Release Urea Fertilizer Based on Waste Mulberry Branches for Potential Agriculture and Horticulture Applications," Sustainable Chem. Eng. 2014, 2, 7, 1871-1878.
Yangfang. "k-CarrageenanSodium Alginate Beads and Superabsorbent Coated Nitrogen Fertilizer with Slow-Release, Water-Retention, and Anticompaction Properties," Ind. Eng. Chem. Res., 2012, 51 (3), pp. 1413-1422.
Chen Lung-Yie, et al. "Effect of deep-application of prilled ammonium bicarbonate fertilizer on the nitrogen supplying status of non-calcareous paddy soils." Acta Pedologica Sinica, 15, 75-82 (1978).
Li, et al. "Ammonium bicarbonate used as a nitrogen fertilizer in China." Fertilizer Research (1980) 1: 125.
Savant et al. "Deep placement of urea supergranules in transplanted rice: Principles and practices." Fertilizer Research (1990) 25: 1.
Song, et al. "Study on fertilizer efficiency and its mechanism of urea and ammonium bicarbonate treated with controlled-release technology." Journal fo Plant Nutrition and Fertilizer, 2003, 9(1): 50-56.

Higuchi, et al. "Further evidence for gaseous CO2 transport in relation to root uptake of CO2 in rice plant, Soil Sciene, and Plant Nutrition." 1984, 30:2, 125-136.
Enoch, et al. "Plant response to irrigation with water enriched with carbon dioxide." New Phytologist, 1993,125: 249-258.
Stolwijk, et al. On the Uptake of Carbon Dioxide and Bicarbonate by Roots, and Its Influence on Growth. Plant Physiol. 1957;32(6):513-20.
Harris-Lovett. (Jul. 22, 2015) GMO rice could reduce greenhouse gas emissions, study says. Retrieved from http://www.latimes.com.
Ikeda, et al. (1992) Stimulation of dark carbon fixation in rice and tomato roots by application of ammonium nitrogen, Soil Science and Plant Nutrition, 38:2, 315-322.
Bergquist, (1964) Absorption of Carbon Dioxide by Plant Roots, Botaniska Notiser, 117:3, 249-261.
Allen, et al. (2005) Crop Responses to Elevated Carbon Dioxide and Interaction with Temperature, Journal of Crop Improvement, 13:1-2, 113-155.
Colmer, et al. (2006), Root aeration in rice (*Oryza sativa*): evaluation of oxygen, carbon dioxide, and ethylene as possible regulators of root acclimatizations. New Phytologist, 170: 767-778.
Wikipedia. "Soil Test." Version: Jun. 25, 2017. (Jun. 25, 2017) Retrieved: Feb. 8, 2019 (Feb. 8, 2019). wikipedia.org.
Livingston. "The Soil As Direct Source of Carbon Dioxide for Ordinary Plants" Plant physiology vol. 9,2 (1934): 237-59.
Leonard. "Effect of Various Oxygen and Carbon Dioxide Concentrations on Cotton Root Development" Plant Physiology Jan. 1946, 21 (1) 18-36.
Madhu. "Dynamics of Plant Root Growth Under Increased Atmospheric Carbon Dioxide" Agron. J. (2013) 105:657-669.
Lowe. "Carbon Dioxide Requirement for Growth of Legume Nodule Bacteria" Soil Science vol. 94, 6 (1962): 351-356.
Ma. "An inorganic CO2 diffusion and dissolution process explains negative CO2 fluxes in saline/alkaline soils" Sci. Rep. 3, 2025 (2013): 1-7.
Majeau. "Effect of CO2 Concentration on Carbonic Anhydrase and Ribulose-1,5-Biphosphate Carboxylase/Oxygenase Expression in Pea" Plant Physiol. vol. 112 (1996): 569-574.
Matocha. "Effects of carbon dioxide and iron enrichment of a calcareous soil on Fe-chlorosis, root and shoot development of grain sorghum." Journal of Plant Nutrition. vol. 11, 6-11 (1988): 1503-1515.
Mauney. "Responses of Glasshouse Grown Cotton to Irrigation with Carbon Dioxide-Saturated Water." Crop Sci. vol. 28, 5 (1088): 835-838.
Miller. "Carbon Dioxide-Bicarbonate Absorption, Accumulation, Effects on Various Plant Metabolic Reactions, and Possible Relations to Lime-Induced Chlorosis." Soil Sci. vol. 89, 5 (1960): 241-245.
Mingo-Castel. "Effect of Carbon Dioxide and Ethylene on Tuberization of Isolated Potato Stolons Cultured in Vitro." vol. 53 (1974) 798-801.
Shingo. The intake and utilization of carbon by plant roots from C14-labeled urea Part I. The determination of radioactive carbon of plant materials and a preliminary seedling experiment utilizing C14-labeled urea. Soil Sci. and Plant Nutrition vol. 3,1 (1957): 59-64.
Moore. "Potential for Irrigation with Carbon Dioxide." Acta Hortic. (1990). www.actahort.org.
Niu. "Effect of elevated CO2 on phosphorus nutrition of phosphate-deficient *Arabidopsis thaliana* (L.) Heynh under different nitrogen forms" Journal of Experimental Botany, vol. 64,1 (2013): 355-367.
Nobel. "Soil O2 and CO2 Effects on Root Respiration of Cacti." Plant and Soil. 120,2 (1989). 263-271.
Novero. "Field-grown tomato response to carbonated water application." Agronomy journal. vol. 83, 5 (1991): 911-916.
Noyes. "Root Variations Induced by Carbon Dioxide Gas Additions to Soil." Botanical Gazette. vol. 66, 4 (1918): 364-373.
Noyes. "Residual Effects of Carbon Dioxide Gas Additions to Soil on Roots of Lactuca sativa." Botanical Gazette. vol. 69,4 (1920): 332-336.

(56) References Cited

OTHER PUBLICATIONS

Noyes. "Effects of Saturating Dioxide." Science. vol. 40, 1039 (1914): 792.
Paliwal "Effect of bicarbonate-rich irrigation waters on the growth, nutrient uptake and synthesis of proteins and carbohydrates in wheat." Plant Soil vol. 43, 1-3 (1975): 523-536.
Palmer. "Cytokinins and Tuber Initiation in the Potato *Solanum tuberosum* L." Nature. vol. 221 (1969): 279-280.
Mitsui. "On the utilization of carbon in fertilizers through rice roots under pot experimental condition." Soil Science and Plant Nutrition. vol. 8,6 (1962): 16-23.
Radford. "New Research Shows Tree Roots Regulate CO2, Keep Climate Stable." Version: Feb. 19, 2014. (Feb. 19, 2014) Retrieved: Jan. 25, 2016 (Jan. 25, 2016). ecowatch.com.
Ryan. "Effect of Surface-Applied Sulfuric Acid on Growth and Nutrient Availability of Five Range Grasses in Calcareous Soils." Journal of Range Management. vol. 28, 5 (1975): 411-414.
Skelding. "The Effect of Carbon Dioxide on the Absorption of Manganese by Root Tissues of Red Beet." Ann Bot. vol. 21, 1 (1957): 121-141.
Skok. "Upate of CO2 by roots of Xanthium plants." Bot. Gaz. 124 (1962): 118-120.
Stoter. "Radioactive Anomalies from Old CO2 in the Soil and Canopy Air." Radiocarbon. vol. 53, 1 (2011): 55-69.
Spittstoesser. "Dark CO2 Fixation and its Role in the Growth of Plant Tissue." Plant Physiol. 41, 5 (1966) 755-759.
Stemmet. "The Uptake of Carbon Dioxide by Plant Roots." Plant and Soil. vol. 17, 3 (1962): 357-364.
Storlie. "Soil, plant, and canopy responses to carbonated irrigation water." Hort. Technology. vol. 6, 2 (1996): 111-114.
Sun. "Effects of elevated CO2 Applied to Potato Roots on the Anatomy and Ultrastructure of Leaves." Biologia Plantarum vol. 55, 4 (2011): 675-680.
Unger. "Influence of Oxygen and Carbon Dioxide on Germination and Seedling Development of Corn (*Zea mays* L)." Agronomy Journal. vol. 57, 1 (1965): 56-58.

\* cited by examiner

FIGURE 3

Example 3 Greenhouse Test Container Location

South

| Greenhouse Cooling System | |
|---|---|

| | |
|---|---|
| | |
| | |
| | |
| | |
| | |
| | |
| | |
| | |
| | |
| | |
| | |
| | |
| | |
| | |

| | |
|---|---|
| R5.J.4 | R5.O.2 |
| R5.I.2 | R5.A.3 |
| R5.N.5 | R5.K.3 |
| R5.A.2 | R5.D.3 |
| R5.D.5 | R5.B.5 |
| R5.L.2 | R5.G.2 |
| R5.I.5 | R5.C.5 |
| R5.F.1 | R5.O.5 |
| R5.M.3 | R5.M.4 |
| R5.H.2 | R5.J.3 |
| R5.C.2 | R5.B.3 |
| R5.A.4 | R5.C.4 |
| R5.L.5 | R5.K.4 |
| R5.N.1 | R5.E.2 |

| | |
|---|---|
| | |
| | |
| | |
| | |
| | R5.F.2 |
| R5.B.1 | R5.M.2 |
| R5.O.3 | R5.C.1 |
| R5.I.3 | R5.H.3 |
| R5.F.5 | R5.G.4 |
| R5.E.1 | R5.E.5 |
| R5.G.3 | R5.A.1 |
| R5.L.3 | R5.K.2 |
| R5.H.4 | R5.N.3 |
| R5.D.2 | R5.J.2 |

| | |
|---|---|
| R5.L.1 | R5.H.1 |
| R5.D.1 | R5.I.1 |
| R5.M.5 | R5.A.5 |
| R5.K.1 | R5.I.4 |
| R5.B.2 | R5.N.2 |
| R5.K.5 | R5.O.1 |
| R5.O.4 | R5.C.3 |
| R5.H.5 | R5.L.4 |
| R5.G.1 | R5.M.1 |
| R5.D.4 | R5.J.1 |
| R5.B.4 | R5.E.4 |
| R5.F.3 | R5.G.5 |
| R5.J.5 | R5.E.3 |
| R5.F.4 | R5.N.4 |

North

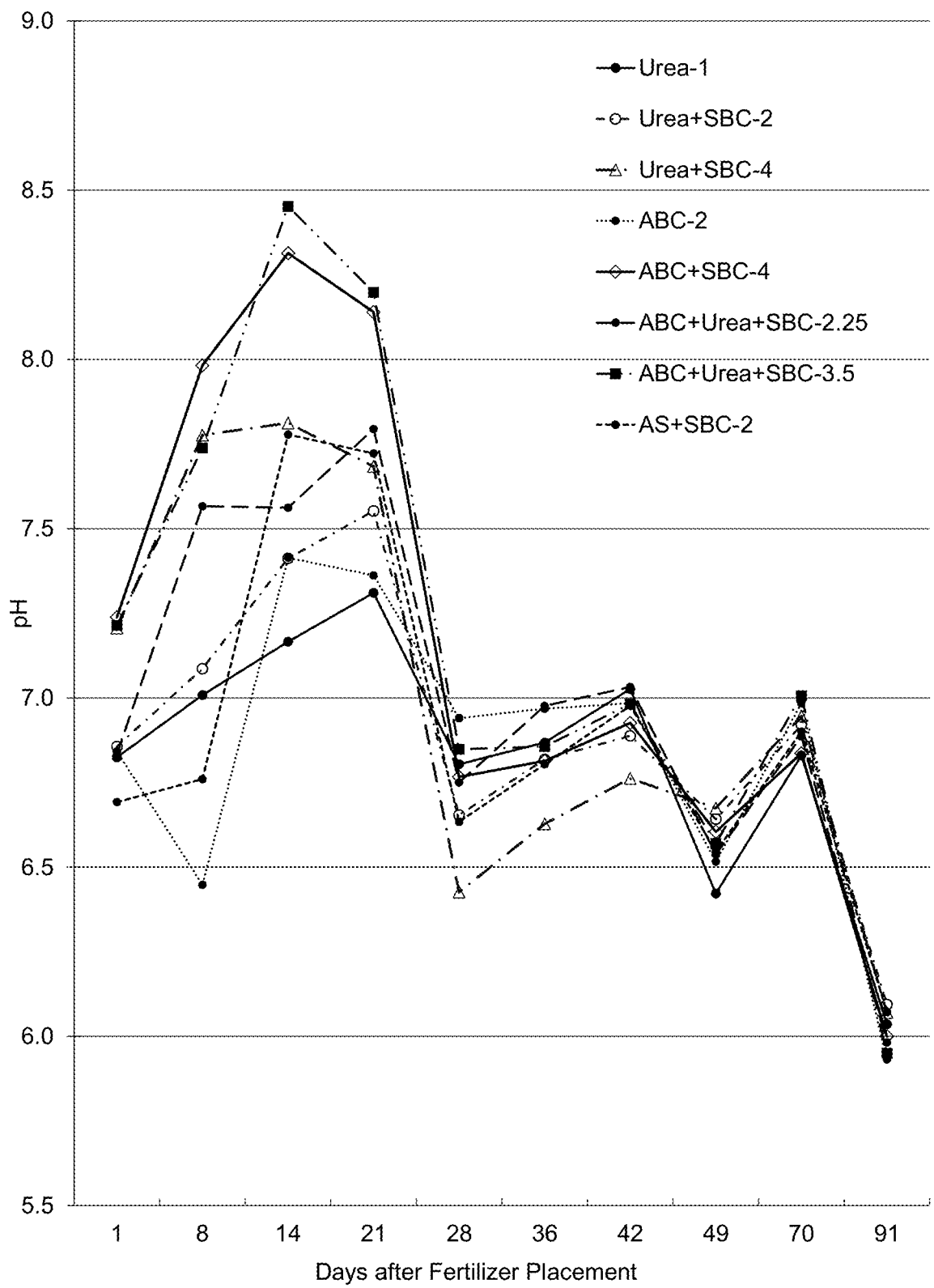

FERTILIZER AND PLANT GROWTH PROMOTER TO INCREASE PLANT YIELD AND METHOD OF INCREASING PLANT YIELD

FIELD OF THE INVENTION

The invention relates to a fertilizer comprising a carbohydrate, a bicarbonate and a nitrogen fertilizer, and a method of growing plants using the fertilizer. The invention further relates to a plant growth promoter comprising a carbohydrate and a bicarbonate, and a method of growing plants using the plant growth promoter.

BACKGROUND OF THE INVENTION

Due to rising populations around the world and limited arable land for growing food, finding ways to improve food production is a serious concern. It is well known that plants need nitrogen, phosphorus, potassium, micronutrients, water and carbon dioxide to grow. Of the three major nutrients: nitrogen, phosphorus, and potassium; nitrogen is needed at the highest level to promote optimal growth. For example according to Subbaiah, et al, a $N:P_2O_5:K_2O$ ratio of 4:2:1 is recommended for growing rice {Subbaiah, S. V., et al. "Studies on yield maximization through balanced nutrient ratios in irrigated lowland rice." International Rice Commission Newsletter (FAO), 50 (2001): 59-65}. However, the carbon required by plants such as a rice plant and its grain is much higher than its need for nitrogen, phosphorus, or potassium. The required nitrogen is typically higher than for phosphorus, potassium and other nutrients. Measurements of 46 w/w % or more carbon and only 1.3 w/w % nitrogen are common for rough rice (the whole rice grain with the hull). These carbon and nitrogen values result in a carbon:nitrogen (C:N) ratio for rough rice of 35:1. This high C:N ratio illustrates that the amount of carbon needed to promote plant growth and yield dramatically outweighs all of the other nutrients.

It is typically accepted that plants obtain carbon dioxide from the surrounding air through the stomata in their leaves. However, the amount of carbon dioxide in air is extremely low (currently about 355 ppm). Carbon is a limiting nutrient in plant growth, and thus finding other ways to supply carbon dioxide to plants have been investigated for years. It is well known that supplying gaseous $CO_2$ to plant leaves increases yield and is a common practice for greenhouse horticulture.

When a plant seed first sprouts, the only nutrients and energy available for growth are stored in the seed. Initially, the roots form and then the leaves. The leaves of the small seedling have very little surface area, and photosynthesis is limited to the amount of energy the leaves can accept as well as carbon available to build new plant cells. If a plant is stimulated to produce early roots, it gives the plant a head start that allows it to more efficiently take up nutrients including carbon that can be at the roots. The present invention uses bicarbonates to stimulate the growth of plant roots early in their development by providing carbon. The present invention also supplies plant roots with additional uptake-available carbon and energy-rich carbohydrates to promote rapid growth that helps to overcome the low surface area of early leaves and therefore further increases plant growth.

It is known to grow algae and cyanobacteria, commonly referred to as blue-green algae, in a water regime, wherein the algae is supplied carbon dioxide either as gaseous $CO_2$ or as bicarbonate to dramatically increase growth. Algae is also grown in the dark using sugar or starch as its energy and carbon source. Now, with a present invention a new fertilizer has been developed to supply energy and nutrients including carbon dioxide, to the roots of plants. Special attention has been paid to developing this fertilizer for plants grown in a water saturated regime and to date this has been most effective. The present inventive fertilizer is greatly effective in growing hydrophilic plants including rice, wild rice (genus: *Zizania*), sugar cane, water chestnuts, lotus, taro, water spinach, watercress, water celery, arrowroot, sago palm, nipa palm, marsh type or fen grasses such as *Saccharum* hybrids, and other biomass crops such as bald cypress and *eucalyptus*. The inventive fertilizer is effective in growing all types of plants. The plants can be grown in soil or hydroponically. Preferred agricultural crops, include corn, wheat, and cotton.

Without being bound by any theory, the inventors believe the inventive fertilizer enhances root growth of the plant.

In the past, studies into supplying carbon dioxide to the roots of plants have led to mixed results. Some of these studies have shown increased root growth and improved nutrient uptake. U.S. Pat. No. 5,044,117 (US '117) discloses a method of fertilization that supplies gaseous carbon dioxide and oxygen to the roots of plants grown hydroponically to improve growth. The present invention provides carbon dioxide and oxygen from bicarbonate to plant roots in a water regime but in contrast with US '117, the present novel fertilizers contain energy rich organic compounds as well as nitrogen, bicarbonates, and other carbon compounds.

It is well known that rice grown in flooded conditions prefers ammonium-based fertilizers. Due to anaerobic conditions under flood, soil microbes starved for oxygen tend to steal the oxygen from nitrate fertilizers leading to loss of plant-available nitrogen as $N_2$. Hence, some fertilizers commonly used today to grow rice include urea, ammonium bicarbonate, and ammonium sulfate.

Urea has been developed as an excellent fertilizer for use with many crops because of its low cost and high nitrogen content. Urea in the presence of water and urease catalyst (naturally occurring in soil) undergoes hydrolysis to produce ammonia and carbamate which further decomposes to ammonia and carbon dioxide as shown in the following equations:

$$(NH_2)_2CO + H_2O \rightarrow NH_3 + H_2NCOOH \rightarrow 2NH_3 + CO_2 \qquad (1)$$

With the presence of water, the ammonia reacts to form ammonium by the following reaction:

$$NH_3 + H_2O \rightarrow NH_4^+ + OH^- \qquad (2)$$

As can be seen from reactions (1) and (2), using urea as a fertilizer also produces carbon dioxide. Shown in present FIG. 1 is a graph of the relationship between the form of dissolved carbon dioxide and solution pH. This graph shows that when the pH of the solution is between 6.5 and 10, the majority of the carbon dioxide in solution is as bicarbonate. Hence, urea used to grow plants under flooded or high moisture conditions slowly generates carbon dioxide which becomes available to the plant as carbon dioxide or bicarbonate, depending on the pH of the soil solution or flood water.

Ammonium bicarbonate ($NH_4HCO_3$) is a fertilizer commonly used in China to grow rice. By examining the formula for ammonium bicarbonate, it is easy to see that for each mole of nitrogen in ammonium bicarbonate, twice as many moles of carbon are available as the carbon available in a nitrogen equivalent amount of urea. This makes ammonium bicarbonate an excellent source of carbon and nitrogen as a plant growth promoter.

It is well known that fertilizer can experience nitrogen losses and therefore decrease the efficiency in plant uptake of the fertilizer and the potential yield of crops. For this reason, various specialty fertilizers and special applications have been developed to improve nitrogen efficiency in plant uptake. Some of these include the development of sulfur coated urea, polymer coated urea, urea formaldehyde fertilizers, fertilizers with urease inhibitors, and supergranules with deep placement. For years, The International Fertilizer and Development Center (IFDC) has researched the benefits of the deep placement of supergranules of fertilizers for its slow release properties in reducing nitrogen loss in rice cultivation (International Fertilizer Development Center et al. *Proceedings of the Workshop on Urea Deep-Placement Technology*, Bogor, Indonesia, September 1984. IFDC, Muscle Shoals, A L, 1985.).

Chinese patents CN1240777A, CN1400196, and CN1408680A recognize the plant yield benefits of supplying gaseous carbon dioxide produced from a solid fertilizer placed in the soil. The ingredients in these solid fertilizers are designed to react with each other to release carbon dioxide gas to plant leaves for plants grown in a covered or protected environment such as in a greenhouse rather than supplying the carbon to the plant roots as a bicarbonate in solution as in the present fertilizer. CN1240777A combines ammonium bicarbonate with a solid acid made by reacting sulfuric acid, nitric acid, lignite, and powdered phosphorus ore; CN1400196 uses calcium carbonate (limestone) as the carbon dioxide source and combines it with sulfur and ammonium phosphate; and CN1408680A uses ammonium bicarbonate as the carbon dioxide source and combines it with bisulfates or bisulfites. By producing the carbon dioxide in gaseous form from the reaction of the fertilizer ingredients, the carbon in the fertilizers of these Chinese patents is inefficient unless it is used in a contained environment like a greenhouse. The present inventive fertilizer holds the carbon in solution as a bicarbonate at the plant roots and therefore can be used to make carbon available to plants in open fields. In addition, the present invention includes urea and alkali bicarbonates and other carbon sources such as starch, magnesium stearate, stearic acid, and wax in the fertilizer and these supply both additional carbon and energy to the plant. These additional carbon sources are not employed in any of these Chinese patents. Finally, the fertilizer of the present invention provides a measurable synergism among the components of the fertilizer to increase crop yield, improve efficiency of nitrogen uptake by the plant, improve nitrogen (protein) levels in plant products, and increase plant uptake of carbon dioxide more than an additive effect.

Lowering fertilizer nitrogen losses when used in growing crops as a result lowers $NO_x$ emissions from growing those crops with nitrogen fertilizer and thereby the contribution to greenhouse gases is also decreased. The inventive fertilizer can lower nitrogen losses, thereby reducing undesirable greenhouse gases.

SUMMARY OF THE INVENTION

An objective is to provide a novel fertilizer for increasing plant yield. A further objective is to provide a novel plant growth promoter for increasing plant yield.

The invention includes a slow release carbohydrate/bicarbonate/nitrogen fertilizer used to produce increased yields in crops, improve efficiency of nitrogen uptake by the plant, improve nitrogen levels in plant products, and increase plant uptake of carbon in crops. The present invention provides energy and carbon in the form of plant available carbohydrates such as for instance starch and/or sugar to the plant roots early in the plant growth, supplies carbon dioxide to the roots of plants in the form of a bicarbonate, and takes advantage of the fertilizer's ability to make available other carbon sources to the plant. The inventive fertilizer can be in solid, semi-solid, or liquid form as desired for the particular application and/or plant. The plant can be grown in soil or hydroponically.

The inventive fertilizer includes a source of nitrogen, a bicarbonate, and an organic energy source. The nitrogen source can be any conventional fertilizer source of nitrogen used to grow plants. Preferred sources of nitrogen include urea, ammonium bicarbonate, ammonium sulfate, ammonium nitrate, urea ammonium nitrate (UAN), monoammonium phosphate (MAP), and diammonium phosphate (DAP) or a combination of these. The bicarbonate is preferably an alkali bicarbonate, such as potassium bicarbonate or sodium bicarbonate. The organic energy source can be a carbohydrate, such as starch or sugar. The inventive fertilizer can optionally contain additional carbon sources like wax, magnesium stearate, and stearic acid. This combination of ingredients including nitrogen, bicarbonate, and organic energy sources provides a measurable synergism demonstrated as unexpected increase in crop yield, improved efficiency of nitrogen uptake by the plant, improved nitrogen levels in plant products, and increased plant uptake of carbon dioxide.

The invention also comprises a plant growth promoter that includes a bicarbonate component and an organic energy source. The bicarbonate is preferably an alkali bicarbonate, such as potassium bicarbonate or sodium bicarbonate. The organic energy source can be a carbohydrate, such as starch or sugar. The inventive plant growth promoter can optionally contain additional carbon sources like wax, magnesium stearate, and stearic acid. This combination of ingredients including bicarbonate, and organic energy sources provides a measurable synergism demonstrated as unexpected increase in crop yield, improved efficiency of nitrogen uptake by the plant, improved nitrogen levels in plant products, and increased plant uptake of carbon dioxide.

The present invention is free of components unsuitable for use to grow plants. Hence, the fertilizer and/or plant growth promoter is free of components harmful to humans or animals such as lithium and heavy metals. For this invention free means that the levels meet the limits set by government for land application and that the levels are below accepted levels that are shown to cause harm to humans or animals consuming the crop.

If soil tests show the soil to be deficient in one or more nutrients then a starter fertilizer that contains typically a small amount of nitrogen with other primary nutrients, secondary nutrients, and micronutrients at the levels indicated by the soil test can be applied. This starter fertilizer can be applied at, before, or just after planting and prior to the application of the present, inventive fertilizer. Alternatively, the starter fertilizer can also be applied with or as part of the inventive fertilizer. This starter fertilizer also includes other nutrients or micronutrients that can be needed for the crop based on the results of soil testing.

The inventive carbohydrate/bicarbonate/nitrogen fertilizer and/or plant growth promoter preferably is applied as a granule, tablet or supergranule (very large granule made by rotary pellet machines in the same manner as range cubes) beneath the soil surface before or after the plants have sprouted. The fertilizer ideally works for crops such as rice, wild rice (genus: *Zizania*), sugar cane, water chestnuts, lotus, taro, water spinach, watercress, water celery, arrowroot, sago palm, nipa palm, marsh-type or fen grasses such as *Saccharum* hybrids, and other biomass crops such as bald cypress and *eucalyptus* grown under flooded or high moisture conditions; and the inventive fertilizer and/or plant growth promoter is applied just before, at, or after flooding the soil with water.

The inventive fertilizer and/or plant growth promoter also provides an increase in yield when used to grow crops not grown in a water environment such as corn, cotton, wheat, cassava, sugar beets, cotton, energy grasses such as *Miscanthus, Pennisetum purpureum*, Switchgrass, and other prairie grasses, and other crops.

Thus, the present invention includes methods of applying the present, inventive fertilizer and/or plant growth promoter, including a double application of fertilizers, i.e., the application of a starter fertilizer followed by the application of the present, inventive fertilizer and/or plant growth promoter, or applying the starter fertilizer and inventive fertilizer and/or plant growth promoter simultaneously. The fertilizer and/or plant growth promotor can be applied above or below the surface, as blends with each other, and/or blends with other common components conventionally blended with fertilizers, in any desired form, such as liquids, solids, semi-solids, and dispersions.

BRIEF DESCRIPTION OF THE DRAWINGS

FIG. 3—shows the layout of Example 3 greenhouse test containers.

FIG. 4—shows a graph of the Example 3 Floodwater pH.

DETAILED DESCRIPTION OF THE INVENTION

Figure 1:
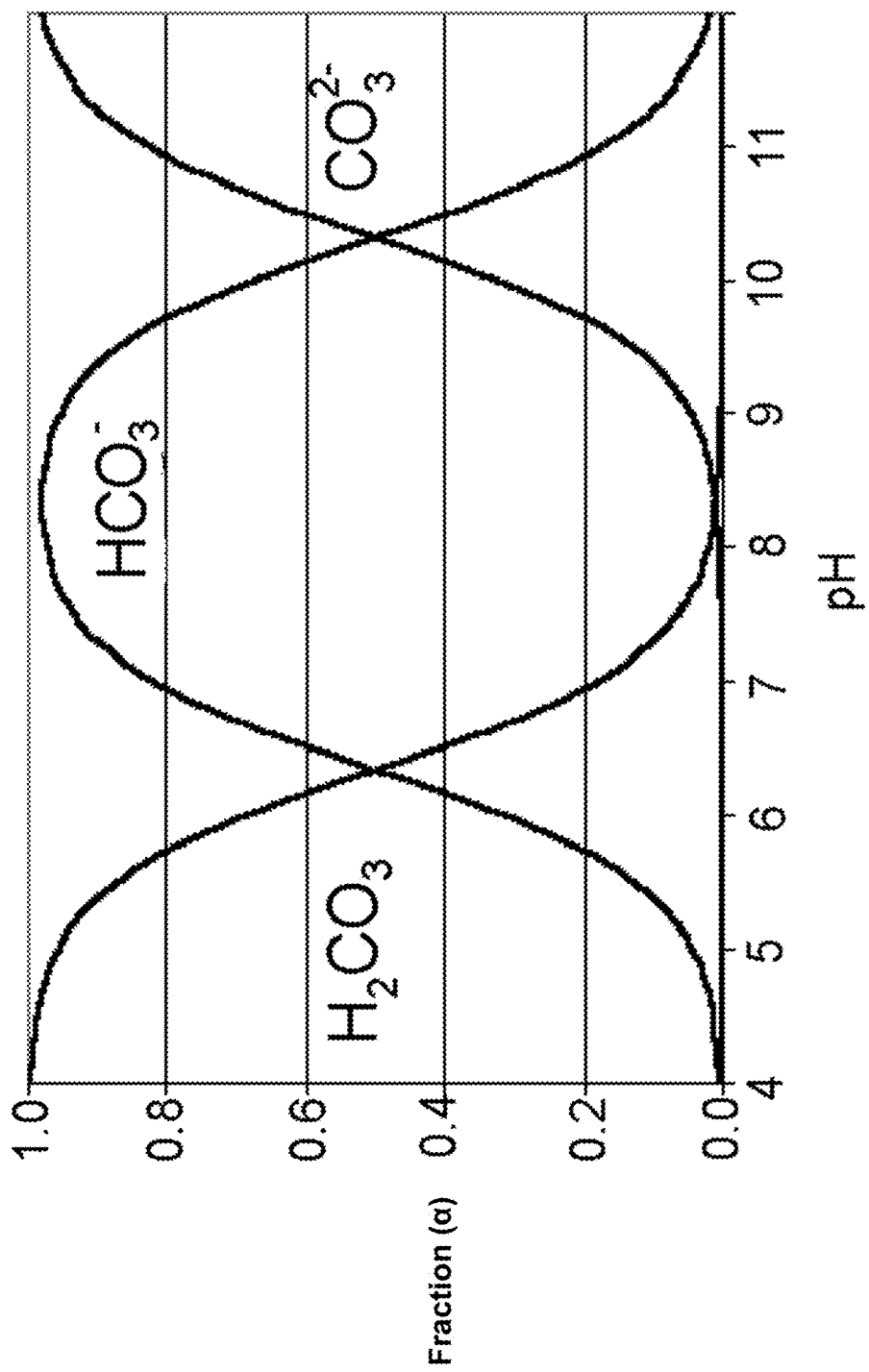
FIG. 1—shows a graph of the fraction of various carbonate forms of carbon dioxide found in solution at atmospheric pressure as a function of pH, graph from Utah State University, www.usa.edu.

The present invention includes a slow release carbohydrate/bicarbonate/nitrogen fertilizer that can be used to produce increased yields in crops; improve efficiency of nitrogen uptake by the plant; improve nitrogen levels in plant products, such as for example, grain; and increase plant uptake of carbon in crops. The present invention provides energy and carbon in the form of carbohydrates such as for instance starch or sugar to the plant early in the plant growth, by supplying carbon dioxide to the roots of plants in the form of a bicarbonate, and by taking advantage of the fertilizer's ability to make available other carbon sources to the plant.

The inventive fertilizer comprises a source of nitrogen, a bicarbonate, and an energy source. The nitrogen source can be any conventional fertilizer source of nitrogen used to grow plants. Preferred sources of nitrogen include urea, ammonium bicarbonate, ammonium sulfate, ammonium nitrate, monoammonium phosphate (MAP), diammonium phosphate (DAP), and urea ammonium nitrate (UAN), or a combination of these. The bicarbonate includes ammonium bicarbonate, potassium bicarbonate and sodium bicarbonate, wherein preferably the bicarbonate is one or more alkali bicarbonate such as potassium bicarbonate and sodium bicarbonate. The energy source comprises a carbohydrate such as starch or sugar as carbon and energy sources. The inventive fertilizer optionally comprises an additional carbon source, such as wax, magnesium stearate, or stearic acid. This combination of ingredients provides a measurable synergism demonstrated as unexpected increase in crop yield, improved efficiency of nitrogen uptake by the plant, improved nitrogen (protein) levels in plant products, and increased plant uptake of carbon dioxide.

An alternative invention comprises a plant growth promoter that includes a bicarbonate component and an organic energy source. The bicarbonate is preferably an alkali bicarbonate, such as potassium bicarbonate or sodium bicarbonate. The organic energy source can be a carbohydrate, such as starch or sugar. The inventive plant growth promoter can optionally contain additional carbon sources like wax, magnesium stearate, and stearic acid. This combination of ingredients including bicarbonate, and organic energy sources provides a measurable synergism demonstrated as unexpected increase in crop yield, improved efficiency of nitrogen uptake by the plant, improved nitrogen levels in plant products, and increased plant uptake of carbon dioxide.

The fertilizer and/or growth promotor can also include any desired additional components that are added to conventional fertilizers, such as fillers, binders, flow promoters, microorganisms, antifungals, time-release ingredients, or other.

The slow release properties of the inventive fertilizer and/or plant growth promoter result from the compact shape but relatively large size including tablets and supergranules (large granules produced by any of the well-known granulation processes), the fertilizer's strength in holding together, and the deep placement of the fertilizer and/or plant growth promoter. In discussing the supergranule form for example, the size of the fertilizer supergranule provides a large volume to surface area ratio that slows the rate of solubility. The supergranule's strength prevents the fertilizer and/or plant growth promoter from quickly breaking apart and the placement of the fertilizer and/or plant growth promoter below the soil surface slows the dispersion rate of the fertilizer and/or plant growth promoter.

An alternative form of the fertilizer and/or plant growth promoter is as a package granule. The package granule comprises a water permeable, water soluble, or bio-degradable outside layer containing within the components of the inventive fertilizer and/or plant growth promoter. The contained components can be in the form of a solid, liquid, or slurry. When the package granule encounters water or soil moisture or the package biodegrades the components start dissolving or dispersing to form a region around the package granule having a higher concentration of components compared to the components found in other areas of the soil. This higher concentration of components around the package granule slows the solubility or dispersion of the contents of the package granule.

Plants can be grown using the inventive fertilizer or plant growth promoter, or combinations of both the inventive fertilizer and the plant growth promoter.

For this description, improved nitrogen efficiency means that nitrogen loss from the fertilizer to the atmosphere is reduced; that nitrogen supplied by the fertilizer is available to the plant for a longer period of time; and that the plant takes up more nitrogen than is supplied by the fertilizer and/or plant growth promoter. Improved carbon uptake efficiency means that plants are able to utilize available carbon sources in the fertilizer, soil, and atmosphere more than plants grown under similar conditions with fertilizers supplying the same levels of primary nutrients (nitrogen, phosphorus, and potassium), secondary nutrients (sulfur, calcium, and magnesium), and the same level of micronutrients such as zinc, boron, iron, copper, manganese, molybdenum, and selenium. The plant utilization of carbon is measured as increased root mass, increased foliage mass, and when present, increased yield of plant product, such as for example grain.

For this description, crop yield refers to the weight of plant product per unit growing area, wherein the plant product is the part of the plant that is valuable as a commercial product, such as grain for example. Crop yield is typically expressed as kg/hectare, tonnes/hectare, bushels/acre, or pounds/acre depending on the type of crop grown.

For this description, the amount of protein in the crop plant product refers to the weight percent of protein found in the crop plant product, such as grain for example. The protein level in the plant product can be quantified by measuring the weight % of nitrogen in the crop plant product.

For this description, biodegradable means that the material is capable of undergoing physical and biological decomposition such that at least 90% of the material ultimately decomposes into carbon dioxide (CO2), biomass, and water in a maximum 48 months.

Ammonium bicarbonate is chosen as the preferred solid form of nitrogen/carbon dioxide to apply since it provides nitrogen with a relatively high carbon dioxide to nitrogen ratio. Compared to urea, ammonium bicarbonate delivers twice the carbon dioxide per mole of nitrogen. Potassium bicarbonate and sodium bicarbonate are also used as sources of carbon dioxide. Choosing the bicarbonate form rather than the carbonate form allows the application of the most carbon dioxide for a given mole of alkali metal and at the same time helps avoid detrimentally high soil pH.

At planting and prior to or with the application of the present carbohydrate/bicarbonate/nitrogen fertilizer or the plant growth promoter, a starter fertilizer can be applied to the soil days before, at, or shortly after planting. This starter fertilizer contains preferably up to 50.4 kg/hectare (45 pounds/acre), more preferably up to 44.8 kg/hectare (40 pounds/acre), more preferably 16.8-39.2 kg/hectare (15-35 pounds/acre), and most preferably 22.4-33.6 kg/hectare (20-30 pounds/acre) of starter nitrogen in the form of a nitrogen fertilizer such as urea, ammonium nitrate, ammonium sulfate, potassium nitrate, mono ammonium phosphate (MAP), diammonium phosphate (DAP), urea-ammonium nitrate (UAN), ammonium bicarbonate, and sodium nitrate. In addition, the starter fertilizer can include other nutrients and micronutrients recommended based on the crop being grown and the soil test results on the soil used to grow the crop. Other nutrients in the starter fertilizer recommended based on soil testing can include phosphorus from fertilizers such as MAP, DAP, triple super phosphate and super phosphate; potassium from fertilizers such as potassium chloride and potassium sulfate; sulfur from elemental sulfur and a variety of sulfate fertilizers; and micronutrients such as magnesium, calcium, zinc, boron, manganese, iron, and more.

The starter fertilizer can comprise one or more of the following nutrients:
1) nitrogen compounds selected from the group consisting of urea, ammonia, ammonium nitrate, ammonium sulfate, calcium nitrate, diammonium phosphate (DAP), monoammonium phosphate (MAP), potassium nitrate, ammonium bicarbonate, and sodium nitrate;
2) phosphorous compounds selected from the group consisting of triple super phosphate, super phosphate, diammonium phosphate, monoammonium phosphate, monopotassium phosphate, dipotassium phosphate, tetrapotassium pyrophosphate, and potassium metaphosphate.
3) potassium compounds selected from the group consisting of potassium chloride, potassium nitrate, potassium sulfate, monopotassium phosphate, dipotassium phosphate, tetrapotassium pyrophosphate, and potassium metaphosphate.
4) secondary nutrients, and micronutrients sources selected from the group consisting of elemental sulfur, calcium carbonate (limestone), dolomite, gypsum, shell, marl, iron sulfate, iron oxides, chelated iron, iron nitrate, zinc sulfate, zinc oxide, chelated zinc, zinc-oxysulfate, zinc carbonate, copper oxide, copper sulfate, copper nitrate, magnesium nitrate, magnesium sulfate, magnesium oxide, sodium borate, boric acid, chelated manganese EDTA, calcium sulfate, calcium nitrate, calcium oxide, magnesium carbonate, selenium sulfate and selenium oxide, sodium tetraborate decahydrate (borax), sodium tetraborate pentahydrate, sodium tetraborate-pentaborate, colemanite, boric acid, ammonium molybdate, sodium molybdate, molybdic oxide, and manganese sulfate.
5) liquid nutrient sources selected from the group consisting of urea-ammonium nitrate (UAN), ammonia, bio slurries, and other slurries and suspensions.
6) organic nutrient sources selected from the group consisting of manures, animal litters, and others.

Unless otherwise stated in this description, all percent amounts are weight percent based on the total weight of the composition. The nitrogen source in the carbohydrate/bicarbonate/nitrogen fertilizer is a combination of preferably up to 90% urea, more preferably up to 75% urea, more preferably 2%-55% urea, and most preferably 5%-45% urea with preferably up to 90% ammonium bicarbonate, more preferably up to 85% ammonium bicarbonate, more preferably 10%-65% ammonium bicarbonate, and most preferably 15%-55% ammonium bicarbonate but can include other sources of nitrogen such as ammonium sulfate, ammonium nitrate, and potassium nitrate, monoammonium phosphate diammoniumum phosphate, to name a few. The urea employed in the inventive fertilizer can be substituted or supplemented with compounds selected from the group consisting of ureaform, urea formaldehyde, methylene urea, methylene diurea and dimethylenetriurea.

In addition to nitrogen, the inventive fertilizer includes alkali bicarbonates such as potassium bicarbonate up to 80%, preferably 10-80%, and sodium bicarbonate up to 80%, preferably 10-80%, and as a combination of the two alkali bicarbonates totaling up to 80%, preferably 10-80%.

Most of the carbon in the inventive fertilizer can be in the form of carbon dioxide from bicarbonate in the fertilizer. However, the carbon can also be from organic compounds that also provide energy to the plant early in the plant growth. These carbon energy sources are preferably as carbohydrates and in particular include soluble carbohydrates such as sugars and starches. Some of these sugars include glucose, sucrose, fructose, maltose, galactose, corn syrup, and lactose. Starches can include corn starch, rice starch, wheat starch, tapioca starch, cassava starch, cornmeal, and potato starch, and others. The carbohydrate can be present in any desired amount in the fertilizer, preferably from 0.1% to 35%, more preferably from 0.2% to 25%, and most preferably from 0.5% to 15%.

The inventive plant growth promoter includes alkali bicarbonates such as potassium bicarbonate at preferably 1% to 99%, more preferably 10-80%, and most preferably 20% to 70%; or sodium bicarbonate at preferably 1% to 99%, more preferably 10-80%, and most preferably 20% to 70%; or as a combination of the two alkali bicarbonates at preferably 1% to 99%, more preferably 10-80%, and most preferably 20% to 70%.

Much of the carbon in the plant growth promoter can be in the form of carbon dioxide from bicarbonate in the fertilizer. However, the carbon can also be from organic compounds that also provide energy to the plant early in the plant growth. These carbon energy sources are preferably as carbohydrates and in particular include soluble carbohydrates such as sugars and starches. Some of these sugars include glucose, sucrose, fructose, maltose, galactose, corn syrup, and lactose. Starches can include corn starch, rice starch, wheat starch, tapioca starch, cassava starch, cornmeal, and potato starch, to name a few. The carbohydrate can be present in any desired amount in the growth promoter, preferably from 0.1% to 99%, more preferably from 1% to 50%, and most preferably from 1% to 35%.

For this description, early in the plant growth means before the plant foliage weight reaches 10% of the plant foliage weight at harvest.

The inventive fertilizer and plant growth promoter each separately can be formed into granules, tablets, or supergranules using bio-degradable binders, lubricants, glidants, and antiadherents that provide additional carbon for uptake by plant roots. These binders, lubricants, glidants, and antiadherents include waxes such as up to 20% paraffin wax, up to 10% stearic acid, up to 10% magnesium stearate, and up to 10% corn starch. A preferable amount of binders, lubricants, glidants, and antiadherents, would be up to 15% paraffin wax, up to 5% stearic acid, up to 5% magnesium stearate, and up to 5% corn starch; and the most preferable amount is 1%-13% paraffin wax, 0.2%-1.5% stearic acid, 0.2%-1.5% magnesium stearate, and 0.2%-1.5% corn starch. Some other possible binders include sugars such as corn syrup, maltodextrin, sucrose, lactose, and glucose; starches like tapioca starch; gums like gelatin; synthetic polymers like polyvinylpyrrolidone (PVP), polyethylene glycol (PEG); cellulose and cellulose derivatives like methylcellulose and ethylcellulose; and waxes including paraffin wax, beeswax, palm wax, and soy bean wax. Other possible lubricants, glidants, and anitadherents include; talc, corn starch, colloidal silica, boric acid, sodium lauryl sulfate, magnesium lauryl sulfate glyceryl palmitostearate, glyceryl behenate, sodium benzoate, sodium oleate, and sodium stearyl fumarate.

The fertilizer and plant growth promoter each separately can be placed beneath the soil 1.3-25.4 cm (0.5-10 inches) deep and more preferably 5.1-12.7 cm (2-5 inches) deep just before, at, or after flooding for rice or other crops grown under flooded or high moisture conditions such as wild rice (genus: *Zizania*), sugar cane, water chestnuts, lotus, taro, water spinach, watercress, water celery, arrowroot, sago palm, nipa palm, marsh-type or fen grasses such as *Saccharum* hybrids, and other biomass crops such as bald cypress and *eucalyptus* grown under flooded or high moisture conditions. The inventive fertilizer and/or growth promoter can be applied just before, at, or after flooding the soil with water. Flooding can be as high as 30.5 cm and preferably less than 10.2 cm. The depth of the fertilizer and/or growth promoter can be chosen based on the depth that provides availability of carbon, nitrogen, and energy to the plant roots and minimizes the loss of these nutrients to the atmosphere as gases. Ideally, the depth is chosen to make the fertilizer available in the root zone of the plant early in the plant growth preferably up to 60 days after planting and most preferably 5-30 days after planting. When planting a seedling, the fertilizer and/or growth promoter can be placed at the time of planting.

With the present invention, carbon dioxide supplied to the roots dramatically improves the yield in plants grown in a water regime in cultivated soils including soils present in fields and greenhouses through the use of a carbohydrate/bicarbonate/nitrogen fertilizer. The fertilizer and/or plant growth promoter can be used to provide a slow release of carbon and nitrogen by using a granule, tablet, or supergranule preferably 0.15-5.10 cm (0.125-2 inches) in diameter, more preferably 0.64-2.50 cm (0.25-1 inch) in diameter, and most preferably 1.3-1.9 cm (0.5-0.75 inch) in diameter. A blend of granules and/or tablets can also be used. The fertilizer and/or growth promoter provides an initial energy source for the young plant, results in a slow rise in pH early in the plant growth and also improves the efficiency in plant uptake of the carbon dioxide from the fertilizer and/or growth promoter by holding the carbon in solution as a bicarbonate.

As shown in the following examples, rice grown with the inventive fertilizer and/or plant growth promoter shows unexpected and significant improvement in total nitrogen utilization and total carbon uptake by plants. Because of the increased carbon utilization in rice, the fertilizer is a form of carbon sink or recycler for lowering carbon dioxide in the atmosphere.

The USDA published average rice yields in 2017 for Arkansas as 8,403 kg/hectare (7,490 lbs./acre) ("Rice: Acreage, Yield, Production, Price, and Value." *United States Department of Agriculture National Agricultural Statistics Service Delta Regional Office: Arkansas*, Jun. 30, 2017. www.nass.usda.gov/ar/). As comparison, our greenhouse studies with a particularly effective example of the inventive fertilizer (KBC+ABC-mid-E of Example 2) comprised of 58% ammonium bicarbonate, 26% potassium bicarbonate, 13% paraffin wax, 1% corn starch, 1% magnesium stearate, and 1% steric acid produced a surprising yield of 17,000 kg/hectare (15,100 lbs./acre). This fertilizer was applied as a buried supergranule early in the plant growth and after applying a starter fertilizer.

For additional comparison, another particularly effective example of the inventive fertilizer (2.4 of see Example 6) was comprised of 10.5% urea, 27.3% ammonium bicarbonate, 58.8% sodium bicarbonate, 1.73% sucrose, and 1.73% corn starch. This fertilizer was applied as a package granule early in the plant growth and after applying a starter fertilizer. The resulting yield was a completely unexpected 18,300 kg/hectare (16,300 lbs./acre).

As demonstrated by the following examples, our inventive fertilizer and growth promoter, and method of application produces unexpectedly high rice yields. The inventive fertilizer and growth promotor, and method of application can surprisingly produce rice yield of 8,000-20,000 kg/hectare (7,140-17,800 lbs/acre), more preferably 10,000-20,000 kg/hectare (8,920-17,800 lbs/acre), more preferably 13,000-20,000 kg/hectare (11,600-17,800 lbs/acre), and most preferably 15,000-20,000 kg/hectare (13,400-17,800 lbs/acre).

A particularly effective fertilizer of the invention (R5.L of Example 3) was used to grow rice from seed that was planted immediately after applying a starter fertilizer of 68.6 kg/hectare (61.2 pounds/acre) urea, 685 kg/hectare (611 pounds/acre) super phosphate, 301 kg/hectare (269 pounds/acre) potassium chloride, 48.9 kg/hectare (43.6 pounds/acre) $ZnSO_4.7H_2O$, and 2808 kg/hectare (2505 pounds/acre) $MgSO_4.7H_2O$. The inventive fertilizer was a nearly spherical 1.9 cm (0.75 in) diameter compressed tablet containing 9.13% urea; 23.71% ammonium bicarbonate; 51.15% sodium bicarbonate; 13% paraffin wax; and 1% each of corn starch, magnesium stearate, and stearic acid. The fertilizer tablets were applied to grow rice at a rate of 1914 kg/hectare (1707 pounds/acre). The fertilizer tablet was placed 7.6-10.2 cm (3-4 inches) beneath the soil surface, 14 days after planting the seed when the plants had reached the four leaf stage and just after the rice was flooded. The resulting rough rice yield from this fertilizer was 59.3% more than the rough rice yield from rice plants grown using 1.9 cm diameter urea tablet fertilizer that received the same starter fertilizer, an equivalent amount of nitrogen and the same timing and depth of placement of the tablets. This particularly effective fertilizer also showed an increase of 57.9% in total nitrogen uptake by the plants, an increase of 10.4% in protein content in the rough rice, and an increase of 59.8% in total carbon uptake by the rough rice as compared to the control.

A particularly effective plant growth promoter of the invention, SBC-low E (Example 2), was used to grow rice from seed that was planted immediately after applying a starter fertilizer of 68.6 kg/hectare (61.2 pounds/acre) urea, 233 kg/hectare (208 pounds/acre) triple super phosphate, 302 kg/hectare (269 pounds/acre) potassium chloride, 27.4 kg/hectare (24.4 pounds/acre) $ZnSO_4.7H_2O$, and 2811 kg/hectare (2505 pounds/acre) $MgSO_4.7H_2O$. The inventive plant growth promoter was cylindrical in shape and was a compressed tablet containing 94% sodium bicarbonate; 13% paraffin wax; and 1% each of corn starch, magnesium stearate, and stearic acid. The plant growth promoter tablets were applied to grow rice where the plant growth promoter application rate was 1165 kg/hectare (1039 pounds/acre). The plant growth promoter tablet was placed 7.6-10.2 cm (3-4 inches) beneath the soil surface 14 days after planting the seed and just after the rice was flooded. At this time, 350 kg/hectare (312 lbs/acre) of urea was also buried beneath the soil surface separately from the inventive plant growth promoter. The resulting rough rice yield from the rice grown with this plant growth promoter was 15.6% more than the rough rice yield from rice plants grown as the baseline test for Example 2.

When used to grow rice, the carbohydrate/bicarbonate/nitrogen fertilizer and/or plant growth promoter provides an unexpected increase in crop yield of 10%-100% or more, an increase in carbon uptake of 10%-100% or more, an increase in nitrogen uptake of 10%-100% or more, and an increase in protein levels in the rough rice of 2%-15%, more preferably 5-20% or more, compared to crops grown in the same soil without the inventive fertilizer and/or plant growth promoter.

Elevated carbon dioxide levels in the atmosphere is of concern for human health, our climate, and the balance of ecosystems. According to a study at the Harvard School of Public Health (Myers, S. S., et al. "Rising $CO_2$ threatens human nutrition." *Nature* 510 (Jun. 5, 2014): 139-142.), rice plants grown with elevated atmospheric carbon dioxide produced rice with lower protein levels. However, the present invention shows an unexpected benefit that with increased carbon uptake by the rice plant there is a corresponding increase of 10% or more in the protein levels in the rice, compared to rice grown in the same soil without the inventive fertilizer and/or growth promoter.

The increase in carbon uptake efficiency of the plant carries with it a completely unexpected increase in nitrogen uptake efficiency and elevated protein levels in the plant products. Without being bound by any theory, the present inventors hypothesize that this surprising synergism between urea, ammonium bicarbonate, and alkali bicarbonates activates the carbon from other sources like the soil and the fertilizer. The inventors further propose that the early release of carbon dioxide in the root zone by the ammonium bicarbonate or alkali bicarbonate triggers enhanced early root growth. Additionally, the soluble carbohydrates in the inventive fertilizer provide both additional plant available carbon and plant available energy early in plant growth when the low surface area of plant leaves limits the available carbon from atmospheric carbon dioxide and energy from the sun. Later the pH of the solution in the plant root zone begins to rise and the carbon dioxide is then in solution as bicarbonate. The roots are able to take up bicarbonate and use it to produce additional plant mass. The use of ammonium bicarbonate or ammonium sulfate provides an immediate source of nitrogen as ammonium ($NH_4^+$) for the plant. The slow release of the alkali bicarbonate by the fertilizer, prevents pH values that are deleterious to the plant but maintains the pH high enough to prevent the loss of carbon dioxide as gas. The anaerobic environment also slows the hydrolysis of the urea and therefore improves the nitrogen efficiency. The hydrogen and oxygen from the bicarbonate is available to the urea and eventually converts the urea to carbon dioxide and ammonia making additional carbon dioxide available to the plant. Because the fertilizer is placed deep in the soil, the ammonia does not readily escape. Instead it quickly dissolves in the surrounding water to form ammonium ($NH_4^+$), again raising the pH of the solution and producing a slow release of carbon dioxide that is held in solution as bicarbonate. Over time, plant and soil activity causes the pH to slowly drop while additional carbon is released to the plant roots from other carbon sources in the fertilizer. The balance between the correct levels of urea, ammonium, initial energy compound, carbon, and bicarbonate at the optimal pH produces a synergistic effect in the water of the root zone that provides an ideal environment to increase crop yield, increase carbon uptake efficiency, increase nitrogen uptake efficiency, and increase plant product protein levels.

An effective method of the invention includes the following:
1) Performing soil tests to identify primary nutrient, secondary nutrient, and micronutrient deficiencies; 2) Applying starter nutrients to the soil early in the crop growth at the levels recommended for the crop being grown and based on the expected yield per acre and the soil test results; 3) Applying the inventive fertilizer and/or plant growth promoter to the soil early in the crop growth before, at, with, or after applying the starter nutrients by burying the fertilizer and/or plant growth promoter, side applying the fertilizer and/or plant growth promoter, broadcasting the fertilizer and/or plant growth promoter, injecting the fertilizer and/or plant growth promoter, spraying the fertilizer and/or plant growth promoter, or any combination of these at the levels recommended for the crop being grown and based on the expected yield per acre and the soil test results; 5) when the plants are grown in a water regime, applying the inventive fertilizer and/or plant growth promoter just before, with, or just after water is applied to the soil or rainfall occurs.

The Examples of the inventive fertilizer and/or plant growth promoter show the following measureable synergisms:

When used to grow rice, the inventive fertilizer and/or plant growth promoter provides an unexpected and dramatic increase in crop yield (see Table 4 of Example 1, Table 7B of Example 2, and Table 11 of Example 3). This increase in crop yield is more than would be expected if supplying just gaseous carbon dioxide to the roots while applying all other plant nutrients and micronutrients at the same levels (Example 1) again showing an effective synergism among the fertilizer ingredients.

Rice grown with the inventive fertilizer shows unexpected and significant improvement in total carbon uptake efficiency by the plants demonstrating that a beneficial interaction occurred with the fertilizer of the invention. Example 3 rice plants grown with the inventive fertilizer took up 59.8% more carbon in their rough rice than the rice plants grown with the control fertilizer (see Table 15). Because of the increased carbon utilization in rice, the fertilizer is a form of carbon sink or recycler for lowering carbon dioxide in the atmosphere.

Rice grown with the inventive fertilizer shows unexpected and significant improvement in total nitrogen utilization by the rice plants. The total nitrogen uptake by the rice plants grown in Example 3 using the inventive fertilizer was 57.9% more than the total nitrogen uptake for the rice plants grown using the control fertilizer of the same example (Table 14). Also, the total nitrogen uptake in the Example 3 rough rice grown with the fertilizer of the present invention showed a 76.5% increase over the total nitrogen uptake in the Example 3 rough rice that was grown with the control fertilizer (Table 12). This shows a dramatic improvement in nitrogen uptake efficiency for the invention.

Surprisingly, the fertilizer of the present invention produced rice with much higher levels of protein than for the control which was completely unexpected. Since the rice grown with the inventive fertilizer was grown with elevated carbon dioxide, the protein levels were expected to be lower than the rice grown with the control fertilizer. Example 3 demonstrated up to a 10.4% increase in protein level in the grain over the protein levels for the rice grown with just urea (Table 12), and an increase of 12.3% was seen from Test 2.4 shown in Table 31.

Introducing elevated carbon dioxide to the roots of plants improves the early formation of plant roots. At 24 days of growth, the roots for the rice plants of Example 1 receiving 2.0% $CO_2$ in air bubbled into the root zone showed a 65% increase in mass over the roots of the plants receiving either air alone or 0.5% $CO_2$ in air (see Table 2).

Carbon dioxide benefits the roots of paddy rice plants through the entire growing season. In Example 1, for all of the plants grown while receiving elevated carbon dioxide at their roots, the average root weights at harvest were higher than for those grown while receiving just air at their roots (see Table 3).

There was an observed upper limit to the amount of carbon dioxide that was beneficial to the plant when it was delivered to the roots. For Example 1 (see Table 4), the rough rice yields for rice plants receiving elevated carbon dioxide were higher than the plants receiving just air with the exception of the plants receiving the highest level of carbon dioxide, 5.0% carbon dioxide mixed with air.

Example 1 demonstrates that supplying carbon dioxide to the roots as a gas, does not provide the synergism that is demonstrated by the inventive fertilizer. The plants receiving carbon dioxide at the roots showed a percent increase in total nitrogen uptake of up to 8.33% on Day 24 (see Table 2) which is very small compared to the percent increase at harvest in the total nitrogen uptake of 57.9% for the most effective inventive fertilizer (Table 14).

Example 2 demonstrates that providing additional carbon dioxide to the roots of rice as bicarbonate improves the yield (see Table 7A and Table 7B).

All but one of the containers in Example 2 with an application of fertilizer and/or plant growth promoter with elevated carbon dioxide from bicarbonates produced rough rice yields that were greater than the controls receiving fertilizer containing just the carbon dioxide from urea (see Table 7A and Table 7B).

The inventive fertilizer containing ammonium bicarbonate combined with potassium bicarbonate containing 2.7 times the carbon dioxide as urea, produced the highest crop yield for Example 2 with an increase of 29.2% over the crop yield for the plants receiving urea only as the nitrogen source (see Table 7B).

The fertilizer that contained sodium bicarbonate in the tablet and no nitrogen source in the tablet (SBC-low-E) supplied carbon dioxide to the roots of plants at 3 times the level found in urea alone (see Table 7B). These Example 2 plants produced a yield that was 15.6% more than the urea alone. The SBC-low-E plants received the same amount and timing of urea, as well as the same amount and timing of the other fertilizers including potassium chloride, triple super phosphate, and zinc sulfate as were given to the control in Container C-E.

Using an alkali metal bicarbonate in the fertilizer provides an additional benefit over not using it. As seen in Table 7A and Table 7B of Example 2, the only fertilizer that did not show improved crop yields with higher levels of carbon dioxide as bicarbonate was the ammonium bicarbonate fertilizer that did not include an alkali metal bicarbonate. This is also shown in Example 3 (see Table 11) where the ammonium bicarbonate without an alkali metal bicarbonate (ABC-2) does not provide a significant increase in crop yield.

In Example 3, all of the plants supplied fertilizer with an alkali bicarbonate had a total nitrogen uptake that exceeded the plants receiving just urea (see Table 14). The combination of urea, ammonium bicarbonate, and sodium bicarbonate provides a synergism as an increased crop yield that was not seen in the yield from any of the other combinations of ingredients. In Example 3, a quite unexpected increase in crop yield of almost 60% was seen from the use of urea, ammonium bicarbonate, and sodium bicarbonate together (ABC+Urea+SBC-3.5). The increase for this combination was almost twice the increase in crop yield from the urea with sodium bicarbonate at almost the same level of carbon dioxide (Urea+SBC-4). This illustrates that for the tests performed in Example 3, the synergy producing the higher crop yield depends on the use of urea with ammonium bicarbonate and an alkali bicarbonate since the carbon in all forms was at essentially the same level in these two fertilizers and all crop nutrients (nitrogen, potassium, phosphorus) and secondary nutrients and micronutrients were supplied at the same level. An interaction occurred between the combination of ingredients and ingredient levels.

The formulation of the inventive fertilizer provides an unexpected increase in nitrogen uptake associated with the additional carbon supplied to the plant and shows a unique synergism that makes additional nitrogen available to the plant. In Example 3, only 1.40 g of nitrogen per container was supplied directly as a combination of starter fertilizer and inventive fertilizer. However, the plants in the containers with the most effective fertilizer of the present fertilizer took up 2.59 g of nitrogen (Table 14). Since this additional nitrogen was not supplied by the added fertilizers, without being bound by any theory, it is believed that the present fertilizer made nitrogen available to the plant from either the soil or the atmosphere.

Carbon supplied as elemental carbon does not have the same effect as using bicarbonates. In Example 3 where graphite was applied as a source of elemental carbon at the roots, there was a negligible increase in yield (see Table 11). As seen in Example 3 (Table 17B) the sodium uptake by the rice is not affected by the elevated levels of sodium in the inventive fertilizer and therefore is not considered a health risk for those eating the rice.

Supplying energy early in the plant growth in the form of a carbohydrate along with carbon from an alkali bicarbonate source provides a surprising increase in yield not seen when the carbohydrate is not present. Example 6 shows an increase in yield of 38% for the SBC-3.5 formulation with cornstarch and sugar as compared to urea without any carbohydrates (see Table 27). For all of the tests in Example 6, the tests using fertilizer containing bicarbonates with carbohydrate produced higher yields than using fertilizer containing urea only (no carbohydrates or bicarbonates). In contrast, merely adding carbohydrates with the urea actually decreased the yield (see Table 27).

If an alkali metal bicarbonate is used in the fertilizer, the fertilizer should be buried. In Example 4 when the inventive fertilizer containing an alkali metal was not buried but rather applied to the flood waters, the plants either died or were stunted.

The present invention will be demonstrated with reference to the following examples, which are of an illustrative nature only and which are to be construed as non-limiting.

EXAMPLES

In the below Examples 1-4, the following abbreviations are used to refer to the compounds in the example fertilizer formulations:
ABC—ammonium bicarbonate
KBC—potassium bicarbonate
SBC—sodium bicarbonate
TSP—triple super phosphate
SP—super phosphate The soils used for each of the examples were tested for pH, P, K, Ca, Mg, S, Na, Fe, Mn, Zn, Cu, B, N, and C. The results of these tests for the soils used for Examples 1-4 are presented in Table 1. The sample labeled A-2 was from the soil used for Example 1, Example 2, and Example 4. Samples A-3 and A-4 were duplicate soil samples for the soil used for Example 3.

cide) was carefully selected as representative of all rice grown commercially and provides an excellent model for testing commercial rice.

As will be shown by the data results for Example 1 the following are concluded:
1) At 24 days of growth, the roots for plants receiving 2.0% $CO_2$ in air bubbled into the root zone showed a 65% increase in mass over the roots of the plants receiving either air alone or 0.5% $CO_2$ in air (see Table 2). Hence, introducing elevated carbon dioxide to the roots improves the early formation of plant roots; 2) The average root weights at harvest were higher for all of the containers of plants receiving elevated carbon dioxide at their roots than for those receiving just air at their roots (see Table 3). Hence the benefit of carbon dioxide gas delivered to the roots of rice plants continues through the entire growing season; 3) The grain yields for rice plants receiving elevated carbon dioxide were higher than the plants receiving just air with the exception of the containers receiving the highest level of carbon dioxide at 5.0% carbon dioxide mixed with air. This demonstrates that providing carbon dioxide to the roots of rice plants increases the yield of grain up to an upper limit of carbon dioxide.

Example 1 demonstrates that supplying carbon dioxide to the roots as a gas, does not provide the synergism that is demonstrated by the inventive fertilizer. The plants receiving carbon dioxide at the roots showed only a small increase in total nitrogen uptake of 8.33% on Day 24 (see Table 2) as compared to the much larger increase in the total nitrogen uptake of 57.9% for the most effective inventive fertilizer of Example 3 (see Table 14).

For the Example 1 tests, carbon dioxide diluted with air in selected amounts was bubbled into the root zone of paddy rice. The rice was planted in 18.9 L (5 gallon) containers which are 30.5 cm (12 inches) in diameter and 35.6 cm (14 inches) deep, and sets of 8 containers all received the same gas mixture. The tests were designed to end after 17 weeks, but some containers were removed earlier to visually check the roots for amount of growth.

TABLE 1

Soil Test Results (performed by the University of Arkansas, Fayetteville, Arkansas)

| Sample ID | pH | P | K | Ca | Mg | S | Na mg/kg | Fe | Mn | Zn | Cu | B |
|---|---|---|---|---|---|---|---|---|---|---|---|---|
| A-2 | 6.6 | 33.3 | 65 | 1231 | 45 | 20.7 | 7.5 | 119 | 209 | 3.9 | 0.7 | 0.9 |
| A-3 | 5.7 | 14.6 | 60 | 634 | 50 | 27.6 | 7.0 | 93 | 156 | 3.7 | 5.7 | 0.45 |
| A-4 | 5.7 | 13.0 | 65 | 608 | 51 | 27.2 | 10.4 | 95 | 164 | 2.1 | 2.0 | 0.41 |

| Sample ID | Total N | Total C % | LOI |
|---|---|---|---|
| A-2 | 0.0978 | 1.2032 | 2.57 |
| A-3 | 0.0536 | 0.7274 | N/A |
| A-4 | 0.0485 | 0.7409 | N/A |

Example 1: Carbon Dioxide and Air Bubbled into Roots

Figure 2:
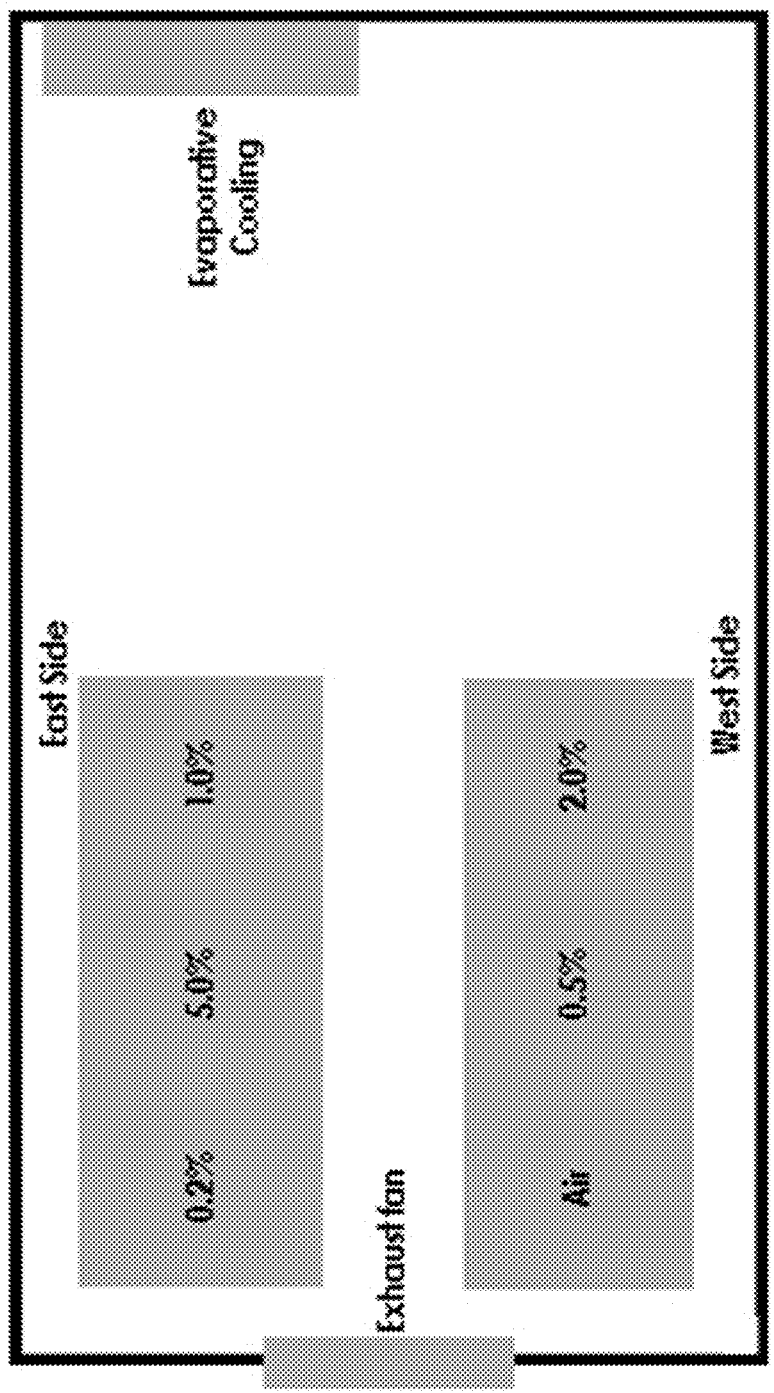
FIG. 2—shows the greenhouse layout for Example 1 Tests of air/carbon dioxide bubbled to root zone of flooded rice.

Example 1 tests were conducted as a baseline to test whether carbon dioxide alone delivered to the roots of rice plants improves the rough rice yield and the root growth. For this example *Oryza sativa* long grain rice variety LaKast™ seed treated with CruiserMaxx® (an insecticide and fungi- For the Example 1 tests, the following gas mixtures were used:
Air
0.2% carbon dioxide in air
0.5% carbon dioxide in air
1.0% carbon dioxide in air
2.0% carbon dioxide in air
5.0% carbon dioxide in air
Note: 0.2% is approximately 5 times the amount of carbon dioxide currently found naturally in air 18.9 L (5 gallon) containers were prepared by placing an aquatic gas diffuser attached to tubing at the bottom of each container and then filling the container 10.2 cm (4 inches) from the top with sieved top soil. The containers were placed on tables in a greenhouse in groups of eight so that all received approximately the same amount of light. Each group of eight containers was attached to a tank of gas with the gas being supplied through a regulator to a flowmeter and then to a set of eight valves each one controlling the gas mixture to a single container. A total of forty-eight containers were prepared, and twenty-four containers were placed on each table. FIG. 2 shows the location in the greenhouse of each set of containers. The soil used for Example 1 was tested for pH, phosphorus, potassium, calcium, magnesium, sulfur, sodium, iron, manganese, zinc, copper, boron, total nitrogen, total carbon, and organic matter content by loss on ignition (LOI) analysis. The results of these soil tests are presented in Table 1 and are labeled Sample A-2. Based on the soil tests, the low soil test phosphorus value of 33.3 mg/kg was supplemented by mixing 1.7 g of triple super phosphate into the top 7.6 cm (3 inches) of soil in each container. Other low soil test values for nitrogen (0.0978%), potassium (65 mg/kg), and magnesium (45 mg/kg) were supplemented by dissolving 150 g of urea (for nitrogen), 132 g of potassium chloride (for potassium), and 1236 g of Epsom salts (magnesium sulfate heptahydrate for magnesium) in 12 liters of water. Each container was then given 200 mL of this solution. On May 25, 2016, zinc was added using zinc sulfate due to the low soil test value for zinc of 3.9 mg/kg. The containers were flooded to 1.3 cm (0.5 inches) above the surface of the soil using collected rainwater. On May 20, 2016, the rice seed was presoaked for 24 hours and then drained for 24 hours was dropped on the surface of the soil in each container. After the rice was established, the plants were thinned to 10 plants per container. At a later date, the plants were thinned again to six plants per container. The gas mixtures to the containers was started on May 20, 2016 and adjusted to an initial flowmeter setting of 42.5 liters/hr. (1.5 ft$^3$/hr.) with a steady flow of bubbles in each container. The flowrate was turned down to 14.2 liters/hr. (0.5 ft$^3$/hr.) on Jun. 14, 2016. The gas flow was supplied each weekday from 8:00 am to noon. During the testing, fans in the greenhouse created a constant airflow to prevent carbon dioxide concentration around a particular group of plants.

On May 25, 2016, 10.6 g of zinc sulfate was dissolved in 10 L of water and each container was given 200 mL of this solution. As the plants grew, the flood waters were gradually raised until they reached a depth of three inches above the soil surface. A flood water depth of 5.1 to 7.6 cm (2 to 3 inches) was maintained for the remainder of the test. On Jun. 13, 2016, one front container (containing 10 plants each) for each level of carbon dioxide was withdrawn for measurement and the plants were gently removed and thoroughly cleaned. The plants and roots were then dried in an oven overnight at 80° C. The next day, the roots were trimmed and weighed. Table 2 presents the total root weights and total foliage weights of the ten plants for each container of plants. The weight of the foliage for each of the containers receiving elevated carbon dioxide was slightly more than the weight of the foliage for the container receiving soley air.

As seen in Table 2, the roots for the plants receiving 2.0% $CO_2$ in air showed a significant increase in dry mass over the plants having less carbon dioxide bubbled into their root zone. This demonstrates that introducing carbon dioxide to the roots does improve the early formation of plant roots.

Also, the percent nitrogen in the rice foliage was measured for the plants on day 24 and these results are also presented in Table 2. The Example 1 plants receiving carbon dioxide at the roots showed only a small increase in total nitrogen uptake of up to 8.33%. However, the total nitrogen uptake by rice plants for the inventive fertilizer results in Example 3 was measured at up to 57.9%. This dramatically higher total nitrogen uptake by the Example 3 rice plants demonstrates that supplying carbon dioxide to the roots as a gas as done in Example 1, does not provide the synergism that is demonstrated by the inventive fertilizer.

TABLE 2

Root Weights and Foliage Nitrogen Uptake for Example 1 Rice Plants at 24 Days

| % $CO_2$ | Dry Root Weight (g) | % Difference of Root Weight as Compared to Air | Dry Foliage Weight (g) | Total Nitrogen Uptake by Foliage (g) | % Difference in Total Nitrogen Uptake |
|---|---|---|---|---|---|
| Air | 1.26 | Baseline | 3.14 | 0.144 | Baseline |
| 0.5% | 1.26 | 0% | 3.48 | 0.156 | 8.33% |
| 2.0% | 2.08 | +65.1% | 3.43 | 0.151 | 4.86% |

On Jun. 20, 2016, the rice plants of Example 1 were thinned to six plants per container. On Aug. 1, 2016, additional nitrogen and triple super phosphate (TSP) was added to each container at the rate of 0.57 g TSP in all containers, 0.87 g of urea per container being fed normal air, and 2.27 g ammonium bicarbonate (equivalent nitrogen content as 0.87 g of urea) for the rest of the containers. This introduction of nitrogen and phosphates was to ensure no limitation in nitrogen and phosphorus for the plants and therefore ensure the testing validity of introducing carbon dioxide as a gas to the roots of the plants. The introduction of a starter fertilizer at, before, or just after planting without introducing additional nutrients after placing the inventive fertilizer was further developed in the later examples.

The rough rice for the Example 1 tests was harvested on Sep. 19, 2016. The rough rice was separated, and dried for seven days at 40° C. After the rice was collected from each plant, two containers from each set was selected to have their roots thoroughly rinsed, dried, and weighed. The resulting average weights of these roots are in Table 3 and show that the root weights were higher for all of containers with plants receiving elevated carbon dioxide.

TABLE 3

Example 1 Average Root Weights at Harvest

| % $CO_2$ | Dry Root Weight (g) | % Difference |
|---|---|---|
| Air | 46.0 | Baseline |
| 0.2 | 62.5 | +35.8% |
| 0.5 | 49.0 | +6.4% |
| 1.0 | 50.4 | +9.6% |
| 2.0 | 51.1 | +11.1% |
| 5.0 | 55.5 | +20.7% |

The dry weights for the rough rice yields from the Example 1 tests are shown in Table 4. With the exception of the containers receiving 5.0% carbon dioxide mixed with air, all of the yields for rice plants receiving elevated carbon dioxide were higher than the plants receiving just air.

TABLE 4

Example 1 Rough Rice Yields

| % CO$_2$ | Yield Weight (g) | % Difference |
|---|---|---|
| Air | 88.9 | Baseline |
| 0.2% | 91.5 | 2.9% |
| 0.5% | 94.3 | 6.1% |
| 1.0% | 99.5 | 11.9% |
| 2.0% | 99.5 | 11.9% |
| 5.0% | 86.2 | −3.0% |

Overall, the tests of Example 1 demonstrate that supplying carbon dioxide at the plant roots increases yield and promotes root growth.

Example 2: 2016 Fertilizer Identification Tests

The objective of the Example 2 tests was to identify solid fertilizers that benefit rice yield by supplying carbon/carbon dioxide/bicarbonate with nitrogen at the roots of the rice plants.

18.9 L (5 gallon) containers of topsoil were prepared for Example 2 by sieving the soil and then filling the containers to 10.2 cm (4 inches) from the top. The soil used for Example 2 was tested for pH, phosphorus, potassium, calcium, magnesium, sulfur, sodium, iron, manganese, zinc, copper, boron, total nitrogen, total carbon, and organic matter content by loss on ignition (LOI) analysis. The results of this soil testing are presented in Table 1 and labeled Sample A-2. Due to the low soil test value for phosphorus (33.3 mg/kg), starter phosphorous fertilizer was applied to each container by mixing 1.7 g of TSP into the top 7.6 cm (3 inches) of soil. Starter fertilizer for zinc was also applied to each container as 0.2 g of zinc sulfate due to the low zinc soil test value of 3.9 mg/kg. Each container was given 0.5 g of urea to supplement the initial nitrogen needs of the plants because the soil test nitrogen value was low at 0.0978%. From the soil tests, the calcium to magnesium ratio was 27:1 which is outside the recommended ratio range of between 5:1 and 15:1. For this reason, the magnesium levels were raised by adding 20.5 g of Epsom salt (MgSO$_4$.7H$_2$O) to each container. The starter fertilizer of zinc sulfate, urea, and Epsom salt was added to the containers in solution form.

At various times during the growth of the plants, the containers were also given tablets containing selected combinations of sodium bicarbonate, potassium bicarbonate, and ammonium bicarbonate. All of the formulations were designed to deliver the equivalent amount of nitrogen to every container but vary the amount of carbon in its various forms. Because potassium was not included in all of the tablet formulations and the soil test value for potassium was low (65 mg/kg), containers without potassium bicarbonate in the tablets were given potassium chloride in solution form at the rate of 2.2 g KCl per container. The potassium bicarbonate provided in the tablets to each container was formulated to provide the equivalent potassium found in 2.2 g of KCl. Ammonium bicarbonate in the tablets was formulated to apply the equivalent nitrogen per container as the nitrogen in 2.55 g of urea. Some containers received tablets all at one time on Jul. 7, 2016 (designated as early) and others received the equivalent total nitrogen split between two tablets, one on Jul. 7, 2016 and the other on Aug. 31, 2016. The containers receiving two tablets were designated as early and late. Table 5 summarizes the application of the various fertilizers for Example 2 and Table 6 gives the tablet formulations used for Example 2.

The fertilizer applied for Example 2 was applied as large tablets that were buried 7.6-10.2 cm (3-4 inches) beneath the soil surface. One purpose of using the large tablets and burying them was to slow the release of the bicarbonate. The tablets were made by mixing fertilizer powder with tablet binders, antiadherents, and glidants that also provided additional carbon in the fertilizer. These tablet binders, lubricators, antiadherents, and glidants were paraffin wax (91.9% Carbon, added as a binder and lubricant), corn starch (46.8% Carbon, added as binder, antiadherent, and glidant), magnesium stearate (73.1% Carbon, added as a lubricant and antiadherent), and stearic acid (75.9% Carbon, added as a binder). The mixture was weighed, placed in a metal tube either 1.91 cm (0.75 inch) in diameter or 2.54 cm (1 inch) in diameter with the appropriate size rod on top, and the rod was pressed with 63 kg/cm$^2$ (900 pounds/in$^2$) of pressure. The resulting tablets were cylindrical and of a diameter chosen to minimize the surface area to volume ratio for the tablet.

TABLE 5

Example 2 Fertilizer Applications

| *Fertilizer Formula Application Code | ***Application Times for tablet or urea | Tablet Weight (g) | **Fertilizer Application |
|---|---|---|---|
| Urea-E | early | N/A | 0.5 g urea at planting + 2.55 g urea early (buried loose) |
| Urea-E, delayed K | early, delayed K | N/A | 0.5 g urea at planting + 2.55 g urea early (buried loose) |
| Urea-E&L | early & late | N/A | 0.5 g urea at planting, 1.275 g urea early, 1.275 g urea late (buried loose) |
| ABC-low-E | early | 7.83 | 0.5 g urea at planting, 1 tablet early |
| ABC-low-E&L | early & late | 3.92 | 0.5 g urea at planting, 1 tablet early & 1 tablet late |
| ABC + SBC-mid-E | early | 15.48 | 0.5 g urea at planting, 1 tablet early |
| ABC + SBC-mid-E&L | early & late | 7.74 | 0.5 g urea at planting, 1 tablet early &1 tablet late |
| ABC + SBC-hg-E | early | 40.12 | 0.5 g urea at planting, 1 tablet early |
| ABC + SBC-hg-E&L | early & late | 20.06 | 0.5 g urea at planting, 1 tablet early & 1 tablet late |
| SBC-low-E | early | 8.50 | 0.5 g urea at planting, 2.55 g urea early (buried loose) |
| ABC + KBC mid-E, delay K | early-delay K | 11.34 | 0.5 g urea at planting, 1 tablet early |
| ABC + KBC + SBC-mid-E&L, delayed K | early and late | 9.59 | 0.5 g of urea at planting, 1 tablet early & 1 tablet late |

*Code meaning: tablet formulation/ingredients-CO$_2$ levels-application time, Low, mid or hg (high) = relative level of carbon dioxide, E or L = early or late.
**All but delayed K runs were given at planting on Jun. 23, 2016: 2.2 g KCl, 1.7 g TSP, 0.2 g ZnSO$_4$, 20.5 g Epsom salt; Delayed K received 1.7 g TSP, 0.2 g ZnSO$_4$, 20.5 g Epsom salt (MgSO$_4$•7H$_2$O) at planting and either KCl or KBC when tablets or urea were applied later.
***Early was on Jul. 7, 2016; Late was on Aug. 31, 2016; Delayed means that the potassium was delayed until Jul. 7, 2016

Abbreviations Used

ABC—ammonium bicarbonate

KBC—potassium bicarbonate

SBC—sodium bicarbonate

TSP—triple super phosphate

SP—super phosphate

TABLE 6

Formulations for Example 2 Tablets

| | Formula Label | | | | | |
|---|---|---|---|---|---|---|
| Ingredients | ABC weight % | ABC + SBC-mid weight % | ABC + SBC-hg weight % | SBC weight % | ABC + KBC weight % | ABC + KBC + SBC weight % |
| ABC | 84.00 | 42.50 | 16.40 | 0 | 58.00 | 34.30 |
| SBC | 0.00 | 42.50 | 68.60 | 84.00 | 0.00 | 34.30 |
| KBC | 0.00 | 0.00 | 0.00 | 0.00 | 26.00 | 15.40 |
| Wax | 13.00 | 12.00 | 12.00 | 13.00 | 13.00 | 13.00 |
| Corn Starch | 1.00 | 1.00 | 1.00 | 1.00 | 1.00 | 1.00 |
| Magnesium Stearate | 1.00 | 1.00 | 1.00 | 1.00 | 1.00 | 1.00 |
| Stearic Acid | 1.00 | 1.00 | 1.00 | 1.00 | 1.00 | 1.00 |
| Total Weight Applied per Container (g) | 7.83 | 15.48 | 40.12 | 8.50 | 11.34 | 19.18 |

As in Example 1, *Oryza sativa* long grain rice variety LaKast™ seed treated with CruiserMaxx® (an insecticide and fungicide) was chosen for this example as an excellent representative of all rice grown commercially. The rice seed was planted in the soil 1.3-1.9 cm (0.5-0.75 inches) deep without flooding on Jun. 23, 2016 and watered to keep the soil moist. After the rice seed sprouted, it was thinned to 10 plants per container. When the rice plants had become established, the plants were thinned to 5 plants per container and on Jul. 7, 2016 the containers were flooded to 1.27 cm (0.5 inch) above the surface of the soil. After flooding, all of the fertilizers marked as early applications were placed in the center of the containers at a depth of 10.1 cm (4 inches) below the surface of the soil. The water level in the containers was gradually increased using collected rain water until the level reached a depth of 7.6 cm (3 inches) above the surface of the soil after which the flood was maintained between 5.1 and 7.6 cm (2 and 3 inches) above the soil surface. On Aug. 31, 2016, the second application of fertilizer was added to the containers as designated in Table 5. This late fertilizer was placed in the center of the container at 10.1 cm (4 inches) beneath the soil surface.

The resulting rough rice yields for the Example 2 fertilizers are presented in Table 7A. All of the containers except one produced rough rice yields that were greater than the controls receiving just the carbon dioxide from urea. The ammonium bicarbonate tablet with potassium bicarbonate containing 2.7 times the carbon dioxide as urea, produced the highest yield of rough rice with an increase of 29.2% over the yield for the container receiving solely urea as the nitrogen source. The container with sodium bicarbonate in the tablet and no nitrogen source in the tablet (SBC-low-E) supplied carbon dioxide to the roots at 3 times the level found in urea alone. This container produced a yield of rough rice that was 15.8% more than the urea alone. The SBC-low-E container received the same amount and timing of urea, as well as the same amount and timing of the other fertilizers including KCl, triple super phosphate, and zinc sulfate as were given to the control in Container C-E. This demonstrates that providing additional carbon dioxide to the roots as bicarbonate, improves the yield of plant products.

TABLE 7A

Example 2 Rough Rice Yields

| Fertilizer Formula Application Code | Average Panicles per Plant | Average Blanks per Panicle | Average Grains per Panicle | Dry Yield in (g/container) |
|---|---|---|---|---|
| ABC + KBC-mid-E | 4.8 | 32.7 | 216.47 | 123.78 |
| ABC + SBC-mid-E | 5.6 | 45.9 | 174.16 | 114.96 |
| ABC + SBC-hg-E&L | 6.0 | 53.3 | 156.25 | 112.26 |
| ABC + KBC + SBC-mid-E&L | 5.8 | 21.7 | 159.86 | 111.43 |
| SBC-low-E | 6.0 | 28.9 | 155.74 | 110.83 |
| ABC + SBC-hg-E | 5.4 | 52.8 | 168.44 | 106.45 |
| ABC-low-E | 4.8 | 54.7 | 189.49 | 106.26 |
| ABC + SBC-mid-E&L | 5.0 | 17.3 | 169.24 | 100.77 |
| Urea-E, delayed K | 5.8 | 17.8 | 142.68 | 99.08 |
| Urea-E | 5.2 | 12.7 | 149.58 | 95.86 |
| ABC-low-E&L | 4.8 | 18.9 | 149.88 | 91.10 |
| Urea-E&L | 5.0 | 13.4 | 130.32 | 84.95 |

TABLE 7B

Example 2 Rough Rice Yields, cont.

| Fertilizer Formula Application Code | Yield % Difference from Urea-E | *$CO_2$ App. Factor |
|---|---|---|
| ABC + KBC-mid-E | 29.1% | 2.7 |
| ABC + SBC-mid-E | 19.9% | 3.8 |
| ABC + SBC-hg-E&L | 17.1% | 9.7 |
| ABC + KBC + SBC-mid-E&L | 16.2% | 4.5 |
| SBC-low-E | 15.6% | 3.0 |
| ABC + SBC-hg-E | 11.0% | 9.7 |
| ABC-low-E | 10.8% | 2.0 |
| ABC + SBC-mid-E&L | 5.1% | 3.8 |
| Urea-E, delayed K | 3.4% | 1.0 |
| Urea-E | Baseline | 1.0 |
| ABC-low-E&L | −5.0% | 2.0 |
| Urea-E&L | −11.4% | 1.0 |

*Ratio of $CO_2$ supplied by the fertilizer per container to $CO_2$ supplied by 2.55 g of urea The only fertilizer that did not show improved yields of rough rice with higher levels of carbon dioxide was the ammonium bicarbonate fertilizer that did not include an alkali metal bicarbonate and the fertilizer was applied as a split application. This demonstrates that using the alkali metal bicarbonate in the fertilizer provides an additional benefit over not using it.

Example 3: Replicated Rice Tests with Solid Fertilizer

To check the benefits of using solid nitrogen based fertilizer with carbon dioxide supplied to the roots, fifteen fertilizer formulation were made into tablets and tested in five replicates. The percent nitrogen in the chemicals used as nitrogen sources to make the Example 3 fertilizer tablets was measured using a carbon and nitrogen elemental analyzer, LECO CN628®, and the results are presented in Table 8. The nitrogen level in each material was as expected based on the chemical formula of the material. The fertilizer formulations for each solid fertilizer is shown in Table 9A and Table 9B. The solid fertilizer tablets for Example 3 were made using a Stokes model #900-519-2® tablet press with a 1.9 cm (0.75 inch) die that produced nearly spherical tablets. Each tablet weighed between 2 and 3 grams.

TABLE 8

Percent Nitrogen in Starting Materials for Example 3

| Sample | % Nitrogen | Average Measured % Nitrogen | Expected % Nitrogen |
|---|---|---|---|
| Ground Urea | 46.809 | 46.67 | 46.62 |
|  | 46.530 |  |  |
| Ground Ammonium Sulfate | 21.428 | 21.27 | 21.19 |
|  | 21.107 |  |  |
| Ammonium Bicarbonate | 17.806 | 17.76 | 17.71 |
|  | 17.717 |  |  |

TABLE 9A

Fertilizer Formulations for Example 3

| | Test Label | | | | | | |
|---|---|---|---|---|---|---|---|
| | R5.A | R5.B | R5.C | R5.D | R5.E | R5.F | R5.G |
| | Formulation Name | | | | | | |
| Ingredients | AS-0 | Urea-1 | Urea + SBC-2 | Urea + SBC-3 | Urea + SBC-4 | ABC-2 | ABC + SBC-3 |
| | Weight % in Formulation | | | | | | |
| ABC | 0.00 | 0.00 | 0.00 | 0.00 | 0.00 | 84.00 | 54.57 |
| SBC | 0.00 | 0.00 | 49.00 | 61.89 | 67.85 | 0.00 | 29.43 |
| AS | 84.00 | 0.00 | 0.00 | 0.00 | 0.00 | 0.00 | 0.00 |
| Urea | 0.00 | 84.00 | 35.00 | 22.11 | 16.15 | 0.00 | 0.00 |
| wax | 13.00 | 13.00 | 13.00 | 13.00 | 13.00 | 13.00 | 13.00 |
| corn starch | 1.00 | 1.00 | 1.00 | 1.00 | 1.00 | 1.00 | 1.00 |
| magnesium stearate | 1.00 | 1.00 | 1.00 | 1.00 | 1.00 | 1.00 | 1.00 |
| stearic acid | 1.00 | 1.00 | 1.00 | 1.00 | 1.00 | 1.00 | 1.00 |
| graphite | 0.00 | 0.00 | 0.00 | 0.00 | 0.00 | 0.00 | 0.00 |
| Weight of tablets per container (g) | 6.65 | 3.04 | 7.29 | 11.54 | 15.79 | 7.88 | 12.13 |

TABLE 9B

Fertilizer Formulations for Example 3, cont.

| | Test Label | | | | | | |
|---|---|---|---|---|---|---|---|
| | R5.H | R5.I | R5.J | R5.K | R5.L | R5.M | R5.N |
| | Formulation Name | | | | | | |
| Ingredients | ABC + SBC-4 | ABC + SBC-5 | ABC + Urea-1.5 | ABC + Urea SBC-2.25 | ABC + Urea SBC-3.5 | AS + SBC-2 | Urea + Graphite-3 |
| | Weight % in Formulation | | | | | | |
| ABC | 40.41 | 32.09 | 60.64 | 38.28 | 23.71 | 0.00 | 0.00 |
| SBC | 43.59 | 51.91 | 0.00 | 30.97 | 51.15 | 47.11 | 0.00 |
| AS | 0.00 | 0.00 | 0.00 | 0.00 | 0.00 | 36.89 | 0.00 |
| Urea | 0.00 | 0.00 | 23.36 | 14.75 | 9.13 | 0.00 | 60.00 |
| wax | 13.00 | 13.00 | 13.00 | 13.00 | 13.00 | 13.00 | 13.00 |
| corn starch | 1.00 | 1.00 | 1.00 | 1.00 | 1.00 | 1.00 | 1.00 |
| magnesium stearate | 1.00 | 1.00 | 1.00 | 1.00 | 1.00 | 1.00 | 1.00 |
| stearic acid | 1.00 | 1.00 | 1.00 | 1.00 | 1.00 | 1.00 | 1.00 |
| graphite* | 0.00 | 0.00 | 0.00 | 0.00 | 0.00 | 0.00 | 24.00 |
| Weight of tablets per container (g) | 16.38 | 20.63 | 5.46 | 8.65 | 13.96 | 15.15 | 4.25 |

*Graphite used to test providing just elemental carbon in the fertilizer 18.9 L (5 gallon) containers were prepared for testing the solid fertilizers for Example 3. The soil for a total of 75 containers was sieved top soil and was tested for pH, phosphorus, potassium, calcium, magnesium, sulfur, sodium, iron, manganese, zinc, copper, boron, total nitrogen, and total carbon. The results of this soil testing are presented in Table 1 and are labeled Samples A-3 & A-4. Each container was weighed with 16.3 kg (36 pounds) of soil. On May 2, 2017 each container received starter fertilizer including 5.0 g of starter superphosphate (18% $P_2O_5$ to supplement the low average soil test value of 13.8 mg/kg) mixed into the top 7.6-10.2 cm (3-4 inches) of the soil. A starter nutrient solution was made by dissolving 40 g of urea (to supplement the low average soil test nitrogen value of 0.0511%), 176 g of KCl (to supplement the low average potassium soil test value of 62.5 mg/kg), 28.5 g of $ZnSO_4.7H_2O$ (to supplement the low average zinc soil test value of 2.9 mg/kg), and 1640 g of Epsom Salt (to supplement the low average magnesium soil test value of 50.5 mg/kg) in 16 liters of rain water. Each container was given 200 mL of the starter nutrient solution. The following day on May 3, 2017, the containers were planted with *Oryza sativa* long grain rice variety Diamond™ seed treated with NipsIt Suite® (an insecticide and fungicide) and AV-1011® (a bird repellent) which was carefully selected as representative of all rice grown commercially and provides an excellent model for testing commercial rice. To plant the rice, the rice seed was pushed 1.9 cm (0.75 inches) beneath the soil surface, and the hole was filled with sand. Between 15 and 17 seeds were planted in each container. The containers were watered with equal amounts of rain water as needed to maintain soil moisture. When the rice plants were established, the containers were thinned to 5 plants each. On May 26, 2017 the containers were flooded with rainwater to a standing water depth of 0.64-1.3 cm (0.25-0.5 inch) above the surface of the soil and this level was stabilized and maintained until May 29, 2017. The flood water in the containers was raised to 5.1 cm (2 inches) above soil surface on June 2 and to 7.6 cm (3 inches) on June 9. After June 9, the level was maintained between 5.1 and 7.6 cm (2 and 3 inches) above soil surface.

As planned, each formulation in Tables 9A&9B was applied to five containers. For this, the tablets were weighed out according to the fertilizer weight requirements in the Tables 9A&9B. The 5 containers for each test were arranged randomly on tables in a greenhouse as shown in FIG. 3. On May 29, 2017, the fertilizer tablets were placed in the center of each container at a depth of 7.6 cm (3 inches) and then covered with soil.

For Example 3, pH readings on various dates were measured in the flood water of each container. These pH measurements are presented in Table 10. A graph of selected measurements is shown in FIG. 4.

TABLE 10

Five Container Average pH Readings of Flood Waters for Example 3 Tests

| Test Label (Formulation Name) | Days after Fertilization |||||||||
|---|---|---|---|---|---|---|---|---|---|
| | 1 | 8 | 14 | 21 | 28 | 36 | 42 | 49 | 70 | 91 |
| | | | | | pH Value | | | | | |
| R5.A (AS-0) | 6.6 | 6.0 | 7.8 | 7.6 | 6.7 | 6.9 | 7.0 | 6.7 | 7.0 | 6.1 |
| R5.B (Urea-1) | 6.8 | 7.0 | 7.2 | 7.3 | 6.8 | 6.9 | 7.0 | 6.4 | 6.8 | 6.0 |
| R5.C (Urea + SBC-2) | 6.9 | 7.1 | 7.4 | 7.6 | 6.7 | 6.8 | 6.9 | 6.6 | 6.9 | 6.1 |
| R5.D (Urea + SBC-3) | 7.0 | 7.8 | 7.7 | 7.7 | 6.9 | 7.0 | 7.1 | 6.5 | 7.0 | 6.1 |
| R5.E (Urea + SBC-4) | 7.2 | 7.8 | 7.8 | 7.7 | 6.4 | 6.6 | 6.8 | 6.7 | 6.9 | 6.1 |
| R5.F (ABC-2) | 6.8 | 6.4 | 7.4 | 7.4 | 6.9 | 7.0 | 7.0 | 6.5 | 7.0 | 5.9 |
| R5.G (ABC + SBC-3) | 7.0 | 7.5 | 7.8 | 7.8 | 6.6 | 6.8 | 6.9 | 6.5 | 6.9 | 6.0 |
| R5.H (ABC + SBC-4) | 7.2 | 8.0 | 8.3 | 8.1 | 6.8 | 6.8 | 6.9 | 6.6 | 6.8 | 6.0 |
| R5.J (ABC + Urea-1.5) | 7.1 | 7.2 | 7.4 | 7.6 | 6.8 | 7.0 | 7.0 | 6.5 | 7.0 | 6.1 |
| R5.K (ABC + Urea + SBC-2.25) | 6.8 | 7.6 | 7.6 | 7.8 | 6.8 | 7.0 | 7.0 | 6.5 | 6.9 | 6.0 |
| R5.L (ABC + Urea + SBC-3.5) | 7.2 | 7.7 | 8.5 | 8.2 | 6.8 | 6.9 | 7.0 | 6.6 | 7.0 | 6.0 |
| R5.M (AS + SBC-2) | 6.7 | 6.8 | 7.8 | 7.7 | 6.6 | 6.8 | 7.0 | 6.5 | 6.9 | 6.1 |
| R5.N (Urea + Graphite-3) | 6.7 | 6.7 | 7.8 | 7.8 | 6.6 | 6.7 | 6.8 | 6.7 | 6.9 | 6.0 |

At harvest, the rough rice was weighed, and the moisture was measured with a moisture balance. The calculated dry weights for the rough rice are presented in Table 11. The results from the Example 3 tests clearly show a benefit in yield from providing carbon at the roots in the form of bicarbonate. The increase of almost 60% was seen from the use of urea, ammonium bicarbonate, and sodium bicarbonate together, and was quite unexpected. The increase for the ABC+Urea+SBC-3.5 was almost twice the increased yield from Urea+SBC-4. This illustrates that the synergy producing the higher yield of grain significantly depends on the use of urea with ammonium bicarbonate and an alkali bicarbonate since the carbon in all forms was at essentially the same level in each fertilizer. An effective interaction occurred between the combination of ingredients and ingredient amounts.

In the case of supplying graphite as a source of elemental carbon at the roots, there was a negligible increase in yield of rough rice demonstrating that the formulation with carbon supplied as elemental carbon does not have the same effect as using bicarbonates. Also, using ammonium bicarbonate without urea and an alkali metal (ABC-2) does not provide any significant increase in yield.

TABLE 11

Rough Rice Yields for Example 3

| Fertilizer Formulation | *Average Dry Rough Rice Yield (g) | % Increase over Urea-1 | **Fertilizer Carbon/ Bicarbonate Factor |
|---|---|---|---|
| ABC + Urea + SBC-3.5 | 89.92 | 59.3% | 3.5 |
| Urea + SBC-4 | 75.79 | 34.3% | 4 |
| Urea + SBC-2 | 71.07 | 25.9% | 2 |
| AS + SBC-2 | 68.25 | 20.9% | 2 |
| ABC + SBC-4 | 67.46 | 19.5% | 4 |
| ABC + Urea + SBC-2.25 | 63.97 | 13.4% | 2.25 |
| ABC + SBC-3 | 62.24 | 10.3% | 3 |
| Urea + SBC-3 | 61.80 | 9.5% | 3 |
| ABC + Urea-1.5 | 61.24 | 8.5% | 1.5 |
| Urea + Graphite-3 | 59.14 | 4.8% | 3 |
| ABC-2 | 58.16 | 3.1% | 2 |
| ABC + SBC-5 | 56.63 | 0.4% | 5 |
| Urea-1 | 56.43 | Baseline | 1 |
| AS-0 | 56.18 | -0.4% | 0 |

*The average yields were calculated based on eliminating the highest and lowest results of each 5 container set.
**Ratio of carbon in the fertilizer to carbon in 2.55 g of urea (ignoring binders, lubricants, and flow agents)

TABLE 12

Nitrogen in Rough Rice for Example 3

| Fertilizer Formulation Name | Sample # | *Average Yield for Fertilizer Formulation (g) | % Nitrogen in Rough Rice | Total Nitrogen Uptake by Rough Rice (g) | % Increase for Total Nitrogen Taken up by Rough Rice as Compared with Urea-1 |
|---|---|---|---|---|---|
| ABC + Urea + SBC-3.5 | Average from Table 13 | 89.92 | 1.59%** | 1.43 | 76.5% |
| Urea + SBC-4 | R5.E.2 | 75.79 | 1.34% | 1.02 | 25.9% |
| Urea + SBC-2 | R5.C.4 | 71.07 | 1.45% | 1.03 | 27.2% |
| AS + SBC-2 | R5.M.2 | 68.25 | 1.32% | 0.91 | 12.3% |
| ABC + SBC-4 | R5.H.4 | 67.46 | 1.35% | 0.91 | 12.3% |
| ABC + Urea + SBC-2.25 | R5.K.5 | 63.97 | 1.30% | 0.83 | 2.5% |
| ABC + SBC-3 | R5.G.3 | 62.24 | 1.36% | 0.85 | 4.9% |
| Urea + SBC-3 | R5.D.4 | 61.80 | 1.24% | 0.77 | -4.9% |
| ABC + Urea-1.5 | R5.J.1 | 61.24 | 1.37% | 0.84 | 3.7% |
| Urea + Graphite-3 | R5.N.3 | 59.14 | 1.41% | 0.83 | 2.5% |
| ABC-2 | R5.F.5 | 58.16 | 1.37% | 0.80 | -1.2% |
| ABC + SBC-5 | R5.I.3 | 56.63 | 1.33% | 0.75 | -7.4% |
| Urea-1 | Average from Table 13 | 56.43 | 1.44%** | 0.81 | Baseline |
| AS-0 | R5.A.2 | 56.18 | 1.41% | 0.79 | -2.5% |

*The average yields were calculated based on throwing out the highest and lowest results of each 5 container set.
**Average of nitrogen in rough rice for three middle yield containers.

The rough rice for the second highest yield of each fertilizer formulation was tested for percent nitrogen using a carbon, hydrogen and nitrogen elemental analyzer, LECO CN628® and for percent carbon with a sulfur and carbon elemental analyzer, LECO SC-144DR®. The results of these measurements are presented in Tables 12 and 13. Recent studies at the Harvard University Center for Environmental Health (Myers, S. S., et al. "Rising $CO_2$ threatens human nutrition." Nature 510 (Jun. 5, 2014): 139-142) demonstrate that rice grown with elevated atmospheric carbon dioxide contain lower protein levels in the grain. Surprisingly, the fertilizer of the present invention produced rice grains with a 10.4% increase in protein level in the rough rice over the rough rice grown with just urea. Also, the total nitrogen uptake in the rough rice of the fertilizer of the present invention showed a 76.5% increase over the total nitrogen uptake in the rough rice that was grown with just urea. This shows a dramatic improvement in nitrogen efficiency for the inventive fertilizer.

TABLE 13

Additional Percent Nitrogen Measured in Rough Rice for Example 3

| Fertilizer Formulation Name | Sample # | % Nitrogen in Rough Rice |
| --- | --- | --- |
| ABC + Urea + SBC-3.5 | R5.L.4 | 1.66 |
| | R5.L.5 | 1.57 |
| | R5.L.3 | 1.54 |
| Urea-1 | R5.B.1 | 1.50 |
| | R5.B.4 | 1.43 |
| | R5.B.3 | 1.40 |

The % nitrogen was measured in the rough rice of each of the middle yield containers for the R5.L formulations and for the R5.B formulations. The results of these measurements are presented in Table 13. As can be seen from the results in Table 13, the protein in the rough rice for all of the ABC+Urea+SBC-3.5 tests was higher than the protein in the rough rice grown with Urea-1. The average % nitrogen for the rough rice from ABC+Urea+SBC-3.5 was 1.59% and for the Urea-1 was 1.44% showing the average increase in protein was significant for ABC+Urea+SBC-3.5 at 10.4%.

Samples of ABC+Urea+SBC-3.5 formulation fertilizer tablets that were made in May were tested for % nitrogen in October. The measured % nitrogen for the ABC+Urea+SBC-3.5 formulation fertilizer was 7.70% and the expected nitrogen was 8.28%. Hence, the high nitrogen efficiency was not due to excess nitrogen supplied by the fertilizer. Also, the total nitrogen taken up by the plants and rough rice (roots not included) for select containers was measured and the results are shown in Table 14. All of the containers that were supplied fertilizer with an alkali bicarbonate had a total nitrogen uptake that exceeded the containers receiving just urea. Only 1.40 g of nitrogen was supplied directly by the starter fertilizer and inventive fertilizer indicating that the formulation of the present inventive fertilizer provides an unexpected increase in nitrogen efficiency associated with the additional carbon supplied to the plant and shows unique synergism that makes additional nitrogen available to the plant.

TABLE 14

Total Nitrogen Uptake by Example 3 Plants at Harvest

| Fertilizer Formulation | Sample Label | *Total Nitrogen Uptake (g) | % Increase in Nitrogen Uptake Compared to Urea-1 |
| --- | --- | --- | --- |
| ABC + Urea + SBC-3.5 | R5.L.4 | 2.59 | 57.9% |
| Urea + SBC-4 | R5.E.2 | 1.71 | 4.3% |
| Urea + SBC-2 | R5.M.2 | 2.14 | 30.5% |
| AS + SBC-4 | R5.M.2 | 1.87 | 14.0% |
| Urea-1 | R5.B.1 | 1.64 | Baseline |

*For plant and rough rice without the roots

Using a sulfur and carbon elemental analyzer, LECO SC-144DR®, the % carbon was measured in the rough rice of selected containers for Example 3, and the results are presented in Table 15. Because the carbon level in rice is significantly more than the nitrogen levels (around 35:1), a significant difference in the % carbon was not expected. However, to obtain a higher yield of plant products, there should be more carbon present for the plant to produce that given yield. This is seen by examining the difference in the total carbon uptake of the rough rice. The total carbon uptake for the present fertilizer was almost 60% more than for uptake of nitrogen. Example 3 demonstrates a dramatic increase in carbon efficiency in plant uptake and again shows that an effective interaction occurred between the plant and the fertilizer of the invention. Furthermore, the increase in uptake of carbon by growing rice with the current fertilizer shows that the fertilizer can be used to lower carbon dioxide in the atmosphere.

TABLE 15

Carbon in the Rough Rice for Example 3

| Fertilizer Formulation | Sample # | *Average Rough Rice Yield per Container (g) | % Carbon in Rough Rice | *Total Carbon Uptake per Container (g) | % Increase in Carbon Uptake as Compared to Urea-1 | **Fertilizer Carbon/ Bicarbonate Factor |
| --- | --- | --- | --- | --- | --- | --- |
| ABC + Urea + SBC-3.5 | R5.L.4 | 89.92 | 47.60 | 42.80 | 59.8% | 3.5 |
| Urea + SBC-4 | R5.E.2 | 75.79 | 47.29 | 35.84 | 33.8% | 4 |
| Urea + SBC-2 | R5.C.4 | 71.07 | 47.08 | 33.46 | 24.9% | 2 |
| AS + SBC-2 | R5.M.2 | 68.25 | 46.87 | 31.99 | 19.4% | 2 |
| ABC + SBC-4 | R5.H.4 | 67.46 | 47.50 | 32.04 | 19.6% | 4 |
| ABC + Urea + SBC | R5.K.5 | 63.97 | 46.95 | 30.03 | 12.1% | 2.25 |

TABLE 15-continued

Carbon in the Rough Rice for Example 3

| Fertilizer Formulation | Sample # | *Average Rough Rice Yield per Container (g) | % Carbon in Rough Rice | *Total Carbon Uptake per Container (g) | % Increase in Carbon Uptake as Compared to Urea-1 | **Fertilizer Carbon/ Bicarbonate Factor |
|---|---|---|---|---|---|---|
| C-2.25 | | | | | | |
| ABC + SBC-3 | R5.G.3 | 62.24 | 47.78 | 29.74 | 11.0% | 3 |
| Urea + SBC-3 | R5.D.4 | 61.80 | 47.37 | 29.27 | 9.3% | 3 |
| ABC + Urea-1.5 | R5.J.1 | 61.24 | 47.52 | 29.10 | 8.6% | 1.5 |
| Urea + Graphite-3 | R5.N.3 | 59.14 | 47.86 | 28.30 | 5.6% | 3 |
| ABC-2 | R5.F.5 | 58.16 | 47.52 | 27.64 | 3.2% | 2 |
| ABC + SBC-5 | R5.I.3 | 56.63 | 47.54 | 26.92 | 0.5% | 5 |
| urea-1 | R5.B.1 | 56.43 | 47.48 | 26.79 | Baseline | 1 |
| AS-0 | R5.A.2 | 56.18 | 46.94 | 26.37 | −1.6% | 0 |

*Based on eliminating the high and low yields of each set of 5 tests
**Ratio of carbon in the fertilizer to carbon in 2.55 g of urea (ignoring binders, lubricants, and flow agents)

It is accepted among agronomists that rice grows best in slightly acidic soil. According to Smith and Dilday (Smith, C. W and Robert H. Dilday. Rice: *Origin, History, Technology, and Production*. John Wiley & Sons, Nov. 25, 2002, p. 272.), the ideal soil pH range for growing rice is 5.5-6.6. A surprising result of the Example 3 tests was that the fertilizer formulation producing the greatest increase in crop yield also showed the highest measured peak pH which reached almost 8.5 (see FIG. 4), and the Urea-1 test sample used for comparison as the control had the lowest peak pH. It is postulated that the higher pH for the carbohydrate/bicarbonate/nitrogen fertilizer helped to trap the carbon in the form of bicarbonate (see FIG. 1) and therefore improved the efficiency of the carbon. Additionally, the urea did not readily hydrolyze due to the anaerobic environment beneath the soil surface. When the urea did form ammonia, it did so slowly and the ammonia was trapped beneath the soil surface and converted to ammonium ($NH_4^+$) which the rice plants were able to use as a nutrient. This made the nitrogen and carbon both slowly available to the plant without losses to the atmosphere.

During the "booting" stage of the rice plant, the reproductive stage of rice when the leaf stem begins to bulge due to the developing panicle, a distinct difference in the color of the ABC+Urea+SBC-3.5 (R5.L formulation) rice plants was noticed. In all five of the R5.L containers, the plants looked much greener than any of the plants in any of the other containers. This darker green color continued all of the way through harvest. Four days after harvest, the chlorophyll of the plants in the Urea-1 containers (R5.B) as well as the R5.L plants was measured using a chlorophyll analyzer, SPAD 502 Meter®. The averages of the measurements for each container are presented in Table 16. These results show that the average chlorophyll for the R5.L plants was 19.8% greater than the chlorophyll in the Urea control containers. The plant material in containers R5.L.4 and R5.B.1 was collected after harvest and analyzed for nitrogen. Based on the % nitrogen values and the weights of the materials, a total nitrogen for the plant material in each container was found giving values of 0.89 g for R5.L.4 and 0.74 g for R5.B.1. Based on these measurements, the plant material for the R5.L.4 container had 20.3% more nitrogen than R5.B.1. Both the plant nitrogen measurements (20.3% increase) and the chlorophyll measurements (19.8% increase) show significant increases and demonstrate yet again that the nitrogen efficiency in the R5.L plants was higher than in the R5.B plants.

TABLE 16

SPAD ® Values for Chlorophyll Measurements of Example 3 R5.L and R5.B Plants

| | Test Label | | | | | | | | | |
|---|---|---|---|---|---|---|---|---|---|---|
| Reading # | L.1 | L.2 | L.3 | L.4 | L.5 | B.1 | B.2 | B.3 | B.4 | B.5 |
| 1 | 34.9 | 43.7 | 29.5 | 44.3 | 49.1 | 31.5 | 36.4 | 36.5 | 32.7 | 42.8 |
| 2 | 40.5 | 39.6 | 38.3 | 36.7 | 44.7 | 34.8 | 27.4 | 32.1 | 32.5 | 45.2 |
| 3 | 39.6 | 41.5 | 35.9 | 31.7 | 45.0 | 30.5 | 23 | 43.8 | 39.1 | 38.6 |
| 4 | 42.3 | 39.6 | 30.5 | 34.7 | 42.7 | 29.8 | 28.7 | 37.5 | 31 | 39.1 |
| 5 | 42.2 | 38.9 | 34.6 | 34.2 | 45.9 | 26.6 | 36.2 | 41 | 20.4 | 40.6 |
| 6 | 39.5 | 43.1 | 24.8 | 32.7 | 44.2 | 35.3 | 38.7 | 27.6 | 31.4 | 40.0 |
| 7 | 33.7 | 42.9 | 42.7 | 35.3 | 45.8 | 33.0 | 38 | 39.4 | 32.8 | 40.6 |
| 8 | 39.5 | 46.1 | 42.2 | 27.3 | 43.7 | 31.7 | 32.5 | 41.3 | 30.1 | 41.7 |
| 9 | 41.5 | 48.3 | 40.4 | 32.4 | 49.1 | 21.8 | 34.9 | 39.4 | 36.7 | 38.2 |
| 10 | 48.6 | 34.6 | 30.0 | 33.9 | 43.4 | 20.8 | 21.4 | 39.7 | 38.4 | 37.4 |
| 11 | 40.1 | 44.6 | 32.7 | 40.5 | 47.6 | 24.3 | 35.6 | 34.0 | 30.4 | 37.1 |
| 12 | 40.1 | 37.9 | 35.5 | 36.3 | 45.8 | 27.7 | 24.3 | 36.2 | 24.9 | 40.1 |
| 13 | 39.4 | 42.6 | 43.2 | 35.7 | 46.6 | 18.1 | 29.4 | 40.2 | 28.1 | 43.4 |
| 14 | 40.9 | 42.1 | 38.8 | 38.6 | 39.0 | 31.6 | 32.3 | 32.9 | 24 | 31.1 |
| 15 | 42.9 | 37.1 | 35.6 | 38.5 | 35.9 | 36.0 | 34.4 | 37.4 | 35.4 | 33.7 |

TABLE 16-continued

SPAD® Values for Chlorophyll Measurements of Example 3 R5.L and R5.B Plants

| Reading # | L.1 | L.2 | L.3 | L.4 | L.5 | B.1 | B.2 | B.3 | B.4 | B.5 |
|---|---|---|---|---|---|---|---|---|---|---|
| 16 | 37.6 | 42.3 | 38.5 | 30.8 | 39.9 | 29.3 | 30.2 | 30.8 | 28.7 | 31.8 |
| 17 | 37.0 | 33.8 | 39.9 | 42.5 | 45.2 | 30.9 | 23.3 | 35.4 | 29 | 37.1 |
| 18 | 42.6 | 33.0 | 41.5 | 32.3 | 42.3 | 23.8 | 25.2 | 34.9 | 17.5 | 34.1 |
| 19 | 35.8 | 43.0 | 34.4 | 43.9 | 40.1 | 23.6 | 21.1 | 40.6 | 32.0 | 41.2 |
| 20 | 30.8 | 43.0 | 39.2 | 32.6 | 45.2 | 32.7 | 30.3 | 23.8 | 31.6 | 35.4 |
| Avg. SPAD® | 39.5 | 40.9 | 36.4 | 35.7 | 44.1 | 28.7 | 30.2 | 36.2 | 30.3 | 38.5 |
| | Overall Average: 39.3 | | | | | Overall Average: 32.8 | | | | |

Phosphorus, magnesium, calcium, potassium, and sodium were measured in the harvested rough rice for test plants by inductively coupled plasma optical emission spectrometry (ICP-OES). The weight percent of each element is listed in Table 17A and Table 17B along with the calculated total uptake of the element by the rough rice. As can be seen from the results, the total uptake of potassium by the rough rice for the Urea-1 (control) was less than the other fertilizer formulations. Also, the sodium uptake by the rough rice was very low. The percent sodium measured on the ICP-OES was near the lower detection limit of the instrument and therefore can be considered to show no significant difference. This demonstrates that the sodium uptake by the rice grains was not affected by the elevated levels of sodium in the fertilizer and therefore is not considered a health risk for those eating the rice.

TABLE 17A

ICP-OES Measurements of Rough Rice for Example 3

| Sample ID | Fertilizer Formulation | Avg. % P | Total P Uptake by Rough Rice (g) | Avg. % Mg | Total Mg Uptake by Rough Rice (g) |
|---|---|---|---|---|---|
| R5.B.1 | Urea-1 | 0.359 | 0.22 | 0.141 | 0.09 |
| R5.B.4 | | 0.391 | 0.21 | 0.135 | 0.07 |
| R5.B.3 | | 0.368 | 0.21 | 0.127 | 0.07 |
| R5.L.4 | ABC + Urea + | 0.307 | 0.32 | 0.127 | 0.13 |
| R5.L.5 | SBC-3.5 | 0.258 | 0.21 | 0.111 | 0.09 |
| R5.L.3 | | 0.279 | 0.24 | 0.128 | 0.11 |
| R5.C.4 | Urea + SBC-2 | 0.325 | 0.30 | 0.129 | 0.12 |
| R5.M.2 | AS + SBC-2 | 0.356 | 0.30 | 0.134 | 0.11 |
| R5.E.2 | Urea + SBC-4 | 0.333 | 0.29 | 0.132 | 0.11 |

TABLE 17B

ICP-OES Measurements of Rough Rice for Example 3, cont.

| Sample ID | Fertilizer Formulation | Avg. % Ca | Total Ca Uptake by Rough Rice (g) | Avg. % K | Total K Uptake by Rough Rice (g) | Avg. % Na |
|---|---|---|---|---|---|---|
| R5.B.1 | Urea-1 | 0.052 | 0.03 | 0.426 | 0.26 | 0.002 |
| R5.B.4 | | 0.044 | 0.02 | 0.435 | 0.23 | 0.004 |
| R5.B.3 | | 0.046 | 0.03 | 0.433 | 0.24 | 0.001 |
| R5.L.4 | ABC + Urea + | 0.040 | 0.04 | 0.397 | 0.41 | 0.001 |
| R5.L.5 | SBC-3.5 | 0.039 | 0.03 | 0.390 | 0.32 | 0.003 |
| R5.L.3 | | 0.058 | 0.05 | 0.400 | 0.34 | 0.004 |
| R5.C.4 | Urea + SBC-2 | 0.046 | 0.04 | 0.432 | 0.40 | 0.002 |
| R5.M.2 | AS + SBC-2 | 0.049 | 0.04 | 0.434 | 0.36 | 0.004 |
| R5.E.2 | Urea + SBC-4 | 0.045 | 0.04 | 0.444 | 0.39 | 0.003 |

Example 4: Applying Carbon Fertilizer Above Vs. Below the Soil

On Aug. 31, 2016, the soil for the tests was prepared in 18.9 L (5 gallon) containers by sieving the soil and then filling the containers to 10.2 cm (4 inches) from the top as in Examples 2 and 3. The soil used for Example 4 was tested for pH, phosphorus, potassium, calcium, magnesium, sulfur, sodium, iron, manganese, zinc, copper, boron, total nitrogen, total carbon, and organic matter content by loss on ignition (LOI) analysis. The results of this soil testing are presented in Table 1 and labeled Sample A-2. Due to the low soil test value for phosphorus (33.3 mg/kg), starter phosphorous fertilizer was applied to each container by mixing 1.7 g of TSP into the top 7.6 cm (3 inches) of soil. Starter fertilizer for zinc was also applied to each container as 0.2 g of zinc sulfate due to the low zinc soil test value of 3.9 mg/kg. Each container was given 0.5 g of urea to supplement the initial nitrogen needs of the plants because the soil test nitrogen value was low at 0.0978%. From the soil tests, the calcium to magnesium ratio was 27:1 which is outside the recommended ratio range of between 5:1 and 15:1. For this reason, the magnesium levels were raised by added 20.5 g of Epsom salt ($MgSO_4 \cdot 7H_2O$) to each container. The starter fertilizer of zinc sulfate, urea, and Epsom salt was added to the containers in solution form. As previously described in Examples 2 and 3, *Oryza sativa* long grain rice variety LaKast™ seed treated with CruiserMaxx® (an insecticide and fungicide) was selected as a representative of all rice grown commercially. The rice was planted on Sep. 1, 2016 with 15 seeds per container by pushing the rice seed 1.3-1.9 cm (0.5 in to 0.75 in) beneath the soil surface. The plants were thinned to nine per container at two weeks and then to five plants per container when the containers were flooded on Sep. 27, 2016. The carbohydrate/bicarbonate/nitrogen fertilizer was added immediately after flooding the soil with water to a level of 0.6-1.3 cm (0.25 in. to 0.5 in) above the soil surface. To make the carbohydrate/bicarbonate/nitrogen fertilizer, the formulas were mixed using the percentages shown in Table 18. The fertilizer was applied as a loose powder either to the flood water or buried 7.6-10.2 cm (3-4 inches) beneath the soil surface. The plants grown with the fertilizers containing alkali bicarbonates showed stress early if the fertilizer was applied to the flood water but not for the fertilizers that were buried. Two of the plants in the container that received ABC+KBC+SBC in the flood waters completely died. All of the plants in the containers with the buried fertilizer appeared healthy. This example demonstrates that if an alkali bicarbonate is used in the fertilizer, preferably the fertilizer is buried rather than applying the fertilizer to the floodwaters early in the plant growth.

TABLE 18

Formulas Used For Example 4 Tests

| | Formula Name | | |
|---|---|---|---|
| | ABC + KBC | ABC + KBC + SBC | Urea + KCl + SBC |
| | 58% ABC | 34.4% ABC | 19.13% ABC |
| | 26% KBC | 15.2% KBC | 16.51% KCl |
| | 13% wax | 34.4% SBC | 49.36% SBC |
| | 1% Corn Starch | 13% wax | 12% wax |
| | 1% Magnesium Stearate | 1% Corn Starch | 1% Corn Starch |
| | 1% Stearic Acid | 1% Magnesium Stearate | 1% Magnesium Stearate |
| | | 1% Stearic Acid | 1% Stearic Acid |
| Formula Weight to Apply per Bucket (g) | 11.34 | 19.18 | 13.33 |

The following tests were performed in 2018 to support the previous work performed in 2016 and 2017. This work was included in the Provisional patent filed on Dec. 15, 2017. All of the rice tests in the examples below were grown in the same greenhouse as used in 2016 and 2017.

Example 5: Comparing the Use of Extra Starter Nutrients and Alternative Source of Ammonium With the exception of Tests 12.1 and 12.2, the rice for the Example 5 Tests was grown in containers with 20 kg of soil each that had been mixed and sieved. The soil used for Tests 12.1 and 12.2 was soil after growing rice for the R5.L tests of Example 3 described in the Provisional patent filed on Dec. 15, 2017. This soil was mixed and there was only enough soil for Tests 12.1 and 12.2 to provide 18.5 kg per container. Soil analyses were performed by the University of Arkansas on soil samples for all of the tests and are shown in Table 20A and Table 20B. For comparison, the soil analyses for the Example 3 Tests are shown in Table 19 which were performed in March 2017. Two samples of the soil were pulled and sent for testing so that R5-A and R5-B were duplicate samples of the same soil. The soil analyses in Table 20A and Table 20B below were performed by the University of Arkansas in April of 2018. Test R5L was for soil dried and mixed from the five R5.L containers after growing rice for Example 3. This soil was then used to grow rice in the R9.12.1 and R9.12.2 tests. The soil samples labeled R9.1, R9.2, R9.3 in Table 20A and Table 20B are for three samples taken from the very large batch of approximately 7.65 m$^3$ (10 yards) top soil prepared to use for Example 5, Example 6, and Example 7 Tests.

TABLE 19

Soil Analyses for Soil Used for 2017 Example Rice Tests

| | | | | mg/kg | | | | |
|---|---|---|---|---|---|---|---|---|
| ID | pH | Fe | Mn | Zn | Cu | B | N | C |
| R5-A | 5.72 | 93.0 | 156 | 3.69 | 5.71 | 0.45 | 536 | 7274 |
| R5-B | 5.67 | 95.3 | 164 | 2.08 | 2.01 | 0.41 | 485 | 7409 |

| | | | mg/kg | | | |
|---|---|---|---|---|---|---|
| ID | pH | P | K | Ca | Mg | S | Na |
| R5-A | 5.72 | 14.6 | 60.4 | 634 | 49.5 | 27.6 | 7.02 |
| R5-B | 5.67 | 13.0 | 64.9 | 608 | 50.9 | 27.2 | 10.38 |

TABLE 20A

Soil Analyses for Soils Used for 2018 Greenhouse Rice Tests

| | | | mg/kg | | | | |
|---|---|---|---|---|---|---|---|
| I.D. | pH | P | K | Ca | Mg | S | Na | Fe |
| R5L | 5.7 | 17.4 | 21.3 | 656 | 142 | 125.5 | 28.8 | 156 |
| R9.1 | 5.9 | 7.6 | 50.2 | 792 | 61 | 34.1 | 6.3 | 83 |
| R9.2 | 5.8 | 7.6 | 50.3 | 775 | 61 | 34.2 | 6.6 | 84 |
| R9.3 | 5.8 | 7.9 | 49.6 | 807 | 63 | 31.4 | 7.1 | 83 |

TABLE 20B

Soil Analyses for Soils Used for 2018 Greenhouse Rice Tests, cont.

| | | | mg/kg | | | |
|---|---|---|---|---|---|---|
| I.D. | pH | Mn | Zn | Cu | B | % N | % C |
| R5L | 5.7 | 312 | 3.64 | 0.63 | 0.20 | 0.0660 | 0.7390 |
| R9.1 | 5.9 | 141 | 0.95 | 0.34 | 0.25 | 0.0617 | 0.6294 |
| R9.2 | 5.8 | 141 | 0.97 | 0.38 | 0.25 | 0.0596 | 0.5819 |
| R9.3 | 5.8 | 147 | 1.05 | 0.37 | 0.25 | 0.0605 | 0.5954 |

TABLE 21A

Starter Nutrients Used for Example 5 Tests

| Test # | Triple Super Phosphate (g/container) | Urea (g/container) | KCl (g/container) | $ZnSO_4 \cdot 7H_2O$ (g/container) |
|---|---|---|---|---|
| 8.1, 8.2, 10.1 | 3.58 | 0.50 | 2.76 | 1.04 |
| 9.1a, 9.1b | 5.37 | 0.50 | 4.14 | 1.56 |
| 9.1c | 5.37 | 0.50 | 1.94 | 1.56 |
| 12.1, 12.2 | 1.59 | 0.50 | 5.89 | 0.356 |
| 1.2 | 3.58 | 0.50 | 0.559 | 1.04 |

TABLE 21B

Starter Nutrients Used for Example 5 Tests, cont.

| Test # | $MgSO_4 \cdot 7H_2O$ (g/container) | Boric Acid (g/container) | $CuSO_4 \cdot 5H_2O$ (g/container) |
|---|---|---|---|
| 8.1, 8.2, 10.1 | 16.6 | 0.0165 | 0.220 |
| 9.1a, 9.1b | 24.9 | 0.0247 | 0.330 |
| 9.1c | 24.9 | 0.0247 | 0.330 |
| 12.1, 12.2 | 0 | 0.206 | 0.126 |
| 1.2 | 16.6 | 0.0165 | 0.220 |

Starter nutrients were added to each of the containers used to grow rice. These starter nutrients are shown in Table 21A and Table 21B. The potassium was adjusted to account for potassium found in the fertilizer formulation so that the containers given potassium in the formulation received a much lower level of potassium in the starter nutrients.

Tests 9.1a, 9.1b, and 9.2c which were given 50% more starter nutrients than the other tests. The 9.2c Tests were given an even higher level of potassium chloride than the 50% more of the other starter nutrients. Since the soil test for 2018 (see Table 20A and Table 20B) showed differences in levels of several nutrients over the 2017 soil tests, these starter nutrients were adjusted to match the levels of phosphate, potassium, zinc, boron, and copper. No magnesium for Tests 12.1 and 12.2 was added since it was already high. These starter nutrients were mixed into the soil in the containers before planting.

Supergranules (SG) of fertilizer were made by mixing the ingredients listed for each formulation in Table 22 and then compressing them into tablets. The fertilizer tablets were nearly spherical in shape and approximately 1.91 cm (0.75 inches) in diameter. After the rice plants in the container reached the 4 leaf stage, water was added to the container to flood the soil until the water maintained a level of 0.64-1.3 cm (0.25-0.5 inches) above the surface of the soil. The weighed fertilizer tablets were then placed 7.6-10.1 cm (3-4 inches) beneath the surface of the soil of each container.

As seen from Table 22, KBC-3.5 and SBC-3.5 were formulations with 50% N from ammonium bicarbonate and 50% N from urea. The number after the hyphen is the level of $CO_2$ provided to each container by the formulation relative to the $CO_2$ provided by 2.55 g of urea. The test noted as U+AS+SBC was a formulation that replaced the 50% N normally given as ammonium bicarbonate with the equivalent N provided as ammonium sulfate.

TABLE 22

Fertilizer Formulations for Example 5 Container

| Compound | 1.2, 9.1b & 9.1c (KBC-3.5) | 8.1, 9.1b & 12.2 (SBC-3.5) | 8.2, 9.1a & 12.1 (U-1) | 10.1 (U + AS + SBC) |
|---|---|---|---|---|
| | | Weight (g) | | |
| Ammonium Sulfate | 0.00 | 0.00 | 0.00 | 28.10 |
| Urea | 12.75 | 12.75 | 25.50 | 12.75 |
| ABC | 33.12 | 33.12 | 0.00 | 0.00 |
| SBC | 0.00 | 71.40 | 0.00 | 71.40 |
| KBC | 85.00 | 0.00 | 0.00 | 0.00 |
| Wax | 18.10 | 18.10 | 4.00 | 18.10 |
| Corn Starch | 1.40 | 1.40 | 0.30 | 1.40 |
| Magnesium Stearate | 1.40 | 1.40 | 0.30 | 1.40 |
| Stearic Acid | 1.40 | 1.40 | 0.30 | 1.40 |
| Total Weight (g) | 153.17 | 139.57 | 30.40 | 134.55 |
| Weight per Container (g) | 15.32 | 13.96 | 3.04 | 13.45 |

After placing the fertilizer tablets, the water levels in the containers were increased by 1.3 cm (0.5 inches) above the soil every other day until the level reached 7.6 cm (3 inches) above the surface of the soil. After this level was reached, the water depth was maintained between 5.1 and 7.6 cm (2-3 inches). Rain water was used for all water for tests in the greenhouse. Care was taken to use the same water for all containers any time that water was applied.

Each of these tests was done in replicates of five. Table 23 and Table 24 show the dry panicle weights per container for the panicles harvested for the Example 5 Tests.

TABLE 23

Dry Panicle Weights per Container for Example 5 Tests Comparing Extra Starter Nutrients

| | | | SBC-3.5 | | KBC-3.5 | | U-1 | |
|---|---|---|---|---|---|---|---|---|
| Test Label | Formulation | Method of Application | Avg. Dry Wgt. (g) | Max Dry Wgt. (g) | Avg. Dry Wgt. (g) | Max Dry Wgt. (g) | Avg. Dry Wgt. (g) | Max Dry Wgt. (g) |
| 8.1, 1.2, 8.2 | Supergranules with 13% wax, 1% cornstarch, stearic acid, and magnesium stearate | SG | 87.6 | 89.2 | 57.8 | 60.2 | 82.8 | 85.1 |
| 9.1b, 9.1c, 9.1a | Same as 8.1, 1.2, and 8.2 but given 50% more starter nutrients | SG | 92.1 | 93.1 | 86.5 | 88.4 | 82.3 | 85.6 |

TABLE 23-continued

Dry Panicle Weights per Container for Example 5 Tests Comparing Extra Starter Nutrients

| | | | SBC-3.5 | | KBC-3.5 | | U-1 | |
|---|---|---|---|---|---|---|---|---|
| Test Label | Formulation | Method of Application | Avg. Dry Wgt. (g) | Max Dry Wgt. (g) | Avg. Dry Wgt. (g) | Max Dry Wgt. (g) | Avg. Dry Wgt. (g) | Max Dry Wgt. (g) |
| 12.2, 12.1 | N/A, Same as 8.1 & 8.2 but grown using soil from R5.L of Example 3 | SG | 77.6 | 86.9 | N/A | | 88.8 | 107.4 |

TABLE 24

Dry Panicle Weights per Container for Example 5 Tests Comparing Alternative Source of Ammonium

| Test Label | Formulation | Method of Application | Avg. Dry Wgt. (g) | Max Dry Wgt. (g) |
|---|---|---|---|---|
| 10.1 | U + AS + SBC | SG | 87.0 | 88.8 |

Conclusions from experimental evidence: 1) Starter nutrients were a limiting factor for the SBC-3.5 and KBC-3.5 formulations but not for the Urea-1. 2) By applying 50% more starter nutrients with our inventive fertilizer, our tests demonstrated up to a 12% increase in yield over the yield for the urea formulation supplied with the same extra starter nutrients. 3) The results showing no increase in yield when extra starter nutrients were used with the urea formulation but an unexpected 12% increase in yield for the inventive fertilizer with extra starter nutrients demonstrate that there is a special synergism with the ingredients of the inventive fertilizer that is not seen when only urea is used. This synergism needs the correct levels of starter nutrients to reach its full potential. 4) Supplying additional starter nutrients for the KBC-3.5 formulation showed a dramatic and unexpected increase in yield (50%) over the same formulation without the additional starter nutrients. Additional starter nutrients used with the SBC-3.5 formulation provided only a 5.1% increase in yield over the rice grown with the SBC-3.5 formulation using the lower levels of starter nutrient. This indicates that the KBC-3.5 was limited by a nutrient that was not as limited for the SBC-3.5. Since the KBC-3.5 formulation received less potassium at planting than the SBC-3.5 formulation received, the test indicates limited availability of early potassium for the KBC-3.5 formulation. 5) The present fertilizer benefits can still be seen the second year when rice is grown in the soil that was previously given SBC-3.5 fertilizer and used to grow rice. When urea was used to fertilize rice grown in this soil, the yield showed a 26% increase over rice grown with urea in untreated soil that did not previously receive the inventive fertilizer.

Example 6: Comparing Use of Carbohydrates in the Novel Fertilizer

During the same tests as Example 5, rice was also grown in the greenhouse for Example 6 Tests. These tests were grown at the same time as the Example 5 tests and used the same processed top soil that was used for the Example 5 Tests. Example 6 Tests were also performed with five replicates of each. Starter fertilizers were used as explained in Example 5. The starter fertilizer for Example 6 applications are listed in Table 25.

TABLE 25

Starter Fertilizers for Example 6.

| Triple Super Phosphate (g per container) | Urea (g per container) | KCl (g per container) | $ZnSO_4 \cdot 7H_2O$ (g per container) | $MgSO_4 \cdot 7H_2O$ (g per container) | Boric Acid (g per container) | $CuSO_4 \cdot 5H_2O$ (g per container) |
|---|---|---|---|---|---|---|
| 3.58 | 0.50 | 2.76 | 1.04 | 16.6 | 0.0165 | 0.220 |

For Example 6, the nitrogen sources and inorganic ingredients and designations are as explained in Example 5. The formulations for each of the Example 6 Tests are given in Table 26A and Table 26B. For the Example 6 Tests, package granules (PG) were used instead of supergranules. These packaged granules were made by weighing out the appropriate formulation and placing them in a water permeable bag that was then buried beneath the surface of the soil 7.6-10.1 cm (3-4 inches) deep after the soil was flooded when the rice plants reached the four leaf stage as described in Example 5. In addition to the inorganic ingredients, the package granules also contained carbohydrates like cornstarch, rice starch, sucrose, and glucose. These carbohydrates were applied at various energy levels referred to as level 1, level 2, and level 3 where level 1 was the lowest energy and level 3 was the highest.

TABLE 26A

Fertilizer Formulations for Example 6

| Compound | 2.1a (SBC-3.5) | 2.1b (U-1) | 2.2a-1 (SBC-3.5) | 2.2a-2 (SBC-3.5) | 2.2a-3 (SBC-3.5) |
|---|---|---|---|---|---|
| | | | Weight (g) | | |
| Urea | 12.75 | 25.50 | 12.75 | 12.75 | 12.75 |
| Ammonium Bicarbonate | 33.12 | 0.00 | 33.12 | 33.12 | 33.12 |

TABLE 26A-continued

Fertilizer Formulations for Example 6

| Compound | 2.1a (SBC-3.5) | 2.1b (U-1) | 2.2a-1 (SBC-3.5) | 2.2a-2 (SBC-3.5) | 2.2a-3 (SBC-3.5) |
|---|---|---|---|---|---|
| | | | Weight (g) | | |
| Sodium Bicarbonate | 71.40 | 0.00 | 71.40 | 71.40 | 71.40 |
| Corn Starch | 0.00 | 0.00 | 1.40 | 4.20 | 7.00 |
| Total Weight (g) | 117.27 | 25.50 | 118.67 | 121.47 | 124.27 |
| Weight per Container (g) | 11.73 | 2.55 | 11.87 | 12.15 | 12.43 |

TABLE 26B

Fertilizer Formulations for Example 6, Cont.

| Compound | 2.2a-4 (U-1) | 2.2a-5 (U-1) | 2.2a-6 (U-1) | 2.2b-5 (U-1) | 2.4 (SBC-3.5) |
|---|---|---|---|---|---|
| | | | Weight (g) | | |
| Urea | 25.50 | 25.50 | 25.50 | 25.50 | 12.75 |
| Ammonium Bicarbonate | 0.00 | 0.00 | 0.00 | 0.00 | 33.12 |
| Sodium Bicarbonate | 0.00 | 0.00 | 0.00 | 0.00 | 71.40 |
| Sucrose | 0.00 | 0.00 | 0.00 | 0.00 | 2.10 |
| Corn Starch | 1.40 | 4.20 | 7.00 | 0.00 | 2.10 |
| Total Weight (g) | 29.70 | 29.70 | 32.50 | 29.90 | 121.47 |
| Weight per Container (g) | 2.97 | 2.97 | 3.25 | 2.99 | 12.15 |

The timing of fertilizer placement followed the same methods as described in Example 5 as well as the watering of the containers. Dry panicle weights per container for each set of tests were measured and are reported in Table 27.

TABLE 27

Dry Panicle Weights per Container for Example 6

| Test Label | Formulation | Method of Application | SBC-3.5 Avg. Dry Wgt. (g) | SBC-3.5 Max Dry Wgt. (g) | U-1 Avg. Dry Wgt. (g) | U-1 Max Dry Wgt. (g) |
|---|---|---|---|---|---|---|
| 2.1a, 2.1b | No carbohydrates | PG | 91.4 | 95.9 | 90.1 | 96.5 |
| 2.2a-1, 2.2a-4 | Level 1 Cornstarch | PG | 95.1 | 99.4 | 79.9 | 83.7 |
| 2.2a-2, 2.2a-5 | Level 2 Cornstarch | PG | 97.0 | 104.1 | 85.6 | 92.3 |
| 2.2a-3, 2.2a-6 | Level 3 Cornstarch | PG | 93.3 | 93.4 | 82.6 | 87.1 |
| 2.4 | Level 2 Cornstarch and Sucrose Combination | PG | 114.6 | 133.5 | N/A | N/A |

Conclusions from experimental evidence: 1) Supplying a combination of sugar and cornstarch in the inventive fertilizer increased the yield by up to 38% over using urea alone. 2) For some examples, supplying carbohydrates with urea alone decreased the yield. 3) The unexpected increase in yield with the inventive fertilizer that is not seen when carbohydrates are used with urea alone indicates that the energy from the carbohydrates is an important component to the synergism between the ingredients of the inventive fertilizer. 4) Supplying extra energy in the form of carbohydrates to the roots of rice plants along with the carbon dioxide in the fertilizer increases the yield of the rice. These tests show the increase in yield to be up to 38% as compared to rice grown with urea alone in the package granule.

Example 7: Comparing the Use of Wax with No Wax and Package Granules with Tablets For Example 7 Tests, rice was grown in the greenhouse in containers as described previously and using the same processed top soil giving soil analyses R9.1, R9.2, and R9.3 in Table 20A and Table 20B. The starter nutrients were applied as described in Example 6 using the starter nutrients and amounts per container shown in Table 28.

TABLE 28

Starter Fertilizer for Example 7.

| Test Label | Triple Super Phosphate | Urea | KCl | $ZnSO_4 \cdot 7H_2O$ | $MgSO_4 \cdot 7H_2O$ | Boric Acid | $CuSO_4 \cdot 5H_2O$ |
|---|---|---|---|---|---|---|---|
| | | | | g/container | | | |
| 2.1a, 2.1b, 2.5a-1, 2.5a-2, 2.5b-1, 2.5b-2, 2.5b-3x | 3.58 | 0.50 | 2.76 | 1.04 | 16.6 | 0.0165 | 0.220 |
| 2.1c, 2.5a-3, 2.5b-3 | 3.58 | 0.50 | 0.559 | 1.04 | 16.6 | 0.0165 | 0.220 |

The formulations for the fertilizers for each test are shown in Table 29. These fertilizers were placed beneath the soil surface as either supergranules (SG) as described in Example 5 or as package granules (PG) as described in Example 6. The following parameters were used for the tests for Example 7: 1) The package granules for 2.1a, 2.1b, 2.1c contained only the inorganic ingredients of their formulation (urea, ammonium bicarbonate, sodium bicarbonate, potassium bicarbonate) but no wax, carbohydrates, or stearates. 2) The package granules for 2.5a-1, 2.5a-2, and 2.5a-3 contained the inorganics ingredients as well as wax, but nothing else. 3) 2.5b-1, 2.5b-2, and 2.5b-3 contained the same ingredients as 2.5a-1, 2.5a-2, and 2.5a-3 respectively but were compressed into tablets.

TABLE 29

Fertilizer Formulations for Example 7

| Compound | 2.1a (SBC-3.5) | 2.1b (U-1) | 2.1c (KBC-3.5) | 2.5a-1, 2.5b-1 (SBC-3.5) | 2.5a-2, 2.5b-2 (U-1) | 2.5a-3, 2.5b-3, 2.5b-3x (KBC-3.5) |
|---|---|---|---|---|---|---|
| | | | Weight (g) | | | |
| Urea | 12.75 | 25.50 | 12.75 | 12.75 | 25.50 | 12.75 |
| Ammonium Bicarbonate | 33.12 | 0.00 | 33.12 | 33.12 | 0.00 | 33.12 |
| Sodium Bicarbonate | 71.40 | 0.00 | 0.00 | 71.40 | 0.00 | 0.00 |
| Potassium Bicarbonate | 0.00 | 0.00 | 85.00 | 0.00 | 0.00 | 85.00 |
| Paraffin Wax | 0.00 | 0.00 | 0.00 | 18.10 | 18.10 | 18.10 |
| Corn Starch | 0.00 | 0.00 | 0.00 | 0.00 | 0.00 | 0.00 |
| Total Weight (g) | 117.27 | 25.50 | 130.87 | 135.37 | 43.60 | 148.97 |
| Weight per Container (g) | 11.73 | 2.55 | 13.09 | 13.54 | 4.36 | 14.90 |

The dry panicle weights per container for the Example 7 tests are shown in Table 30.

TABLE 30

Average Dry Panicle weights per Container for Example 7

| Test Label | Formulation | Method of Application | SBC-3.5 Avg. Dry Wgt. (g) | KBC-3.5 Avg. Dry Wgt. (g) |
|---|---|---|---|---|
| 2.1a, 2.1c, 2.1b | Package granules no carbohydrates, no paraffin wax | PG | 74.2 | 66.7 |
| 2.5a-1, 2.5a-3, 2.5a-2 | Package granules with paraffin wax but no carbohydrates | PG | 74.7 | 60.9 |
| 2.5b-1, 2.5b-3, 2.5b-2 | Tablets with paraffin wax but no carbohydrates | SG | 76.6 | 57.3 |
| N/A, 2.5b-3x, N/A | Tablets with paraffin wax and extra starter potassium | SG | N/A | 89.1 |

The following conclusions can be drawn from the test results: 1) Paraffin wax does not provide an early energy source or early carbon to increase yield. 2) When potassium bicarbonate is supplied in a compressed tablet, the potassium availability is limited. 3) Increasing the starter potassium overcomes the limited availability of potassium and increases the yield.

Example 8: Nitrogen Levels in Rough Rice

Nitrogen levels in the rough rice from several tests was analyzed in the laboratory to check for protein levels in the grain. The rice analyzed included Test 8.2 of Example 5 and Test 2.4 of Example 6. For Examples 5-7, the rice was planted at the same time, randomly placed in the greenhouse, grown under the same conditions, given the same level of starter nutrients, and harvested at the same time. Table 31 shows the average weight percent of nitrogen measured in the rough rice and the total nitrogen uptake by the rough rice. The total nitrogen uptake by the rough rice was found by multiplying the weight percent of nitrogen measured by the weight of the rough rice harvested for that test.

TABLE 31

Rough Rice Nitrogen Weight Percent

| Test Label | Formulation | Application Type | Nitrogen Wgt. % | % Difference in Protein Levels | Total Nitrogen Uptake (g) | % Difference in Total Nitrogen Uptake |
|---|---|---|---|---|---|---|
| 2.4 | SBC-3.5 with Level 2 Cornstarch and Sucrose Combination | PG | 1.28 | 12.3% | 1.71 | 76.3% |
| 8.2 | U-1 Supergranules with 13% wax, 1% cornstarch, stearic acid, and magnesium stearate | SG | 1.14 | Baseline | 0.97 | Baseline |
| 13.2b | Urea flooded in at 1.5 times the level of nitrogen in 8.2 | Granules Flooded in 70/30 | 1.30 | 12.3% | 1.45 | 49.5% |

The following conclusions can be reached from the experimental evidence: 1) As seen previously in Example 3 Table 30, the inventive fertilizer increased the protein levels in the rough rice as compared to rice grown with recommended levels of urea. For this test, the inventive fertilizer increased the protein levels in the rice by 13% as compared to rice grown with the same level of nitrogen as using urea. 2) Increasing the nitrogen applied over what is typically recommended also increased the protein levels in rice. 3) The total nitrogen uptake in the rice grain was 49.5% more for rice grown with 50% more nitrogen as urea. This increase is what would be expected. 4) The total nitrogen uptake in the rice grain for the inventive fertilizer receiving lower levels of nitrogen was unexpectedly much higher at up to 76.3% more. This shows that the inventive fertilizer provides a special synergism that dramatically improves the nitrogen efficiency of the fertilizer.

Following all of these tests, our new understanding of the fertilizer and synergies involved show that under the right conditions, our inventive fertilizer can increase the yield for many crops that are not grown in a water regime such as corn, wheat, cotton, barley, cassava and more.

While only a few exemplary embodiments of this invention have been described in detail, those skilled in the art will recognize that there are many possible variations and modifications which can be made in the exemplary embodiments while yet retaining many of the novel and advantageous features of this invention. Accordingly, it is intended that the following claims cover all such modifications and variations.

The invention claimed is:

1. A method of increasing crop yield and increasing protein levels in plant products, comprising the following steps:
   applying a slow-release, synergistic composition comprising:
      a nitrogen source comprising a combination of 2 to 75 wt % urea and 10 to 85 wt % ammonium bicarbonate;
      a carbohydrate in an amount of 1 to 35 wt %; and
      at least one alkali bicarbonate in an amount of 10 to 80 wt % selected from the group consisting of potassium bicarbonate, sodium bicarbonate, or a mixture of potassium bicarbonate and sodium bicarbonate to a root zone of a plant, wherein the slow-release, synergistic composition is in a solid or semi-solid form, the root zone contains water and roots of the plant, and the wt % is based on the total weight of the slow-release, synergistic composition; and
   the slow-release, synergistic composition providing a slow release of bicarbonate to the water at a pH of from 6.5 to 10 so that the roots of the plant absorb the bicarbonate or carbon dioxide from the water.

2. The method of claim 1, wherein the slow-release, synergistic composition in a form of granules or tablets.

3. The method of claim 1, wherein the slow-release, synergistic composition is placed 1.3-25.4 cm beneath a surface of soil containing the root zone.

4. The method of claim 1, wherein a surface of soil containing the root zone is beneath a covering of water that is less than 30.5 cm deep.

5. The method of claim 1, wherein the plant is selected from the group consisting of rice, wild rice (genus: *Zizania*), sugar cane, water chestnuts, lotus, taro, water spinach, watercress, water celery, arrowroot, sago palm, nipa palm, marsh-type grasses, bald cypress, and *eucalyptus*.

6. The method of claim 1, wherein the plant is selected from the group consisting of corn, wheat, cassava, sugar beets, sweet potatoes, cotton, and energy grasses such as *Miscanthus, Pennisetum* purpureum, Switchgrass, and other prairie grasses.

7. The method of claim 1, wherein the source of nitrogen further comprises at least one of an ammonium bicarbonate, ammonium sulfate and ammonium nitrate, and the carbohydrate comprises starch or sugar.

8. The method of claim 1, wherein the slow-release, synergistic composition is in the form of packages or blends.

9. The method of claim 1, wherein the source of nitrogen further comprises at least one of monoammonium phosphate, diammonium phosphate, and urea ammonium nitrate, and the carbohydrate comprises starch or sugar.

10. The method according to claim 1, wherein the plant is rice and the method further comprises increasing rice yield comprising:
    applying the slow-release, synergistic composition to the root zone in an amount to increase the rice yield by at least 50% compared to rice grown without the slow-release, synergistic composition.

11. The method according to claim 10, further comprising increasing the rice yield by at least 100% compared to rice grown without the slow-release, synergistic composition.

12. The method according to claim 10, further comprising increasing protein in the rice by at least 2% compared to the amount of protein in rice grown without the slow-release, synergistic composition.

13. The method according to claim 1, wherein the slow-release, synergistic composition providing a slow release of bicarbonate to the water over a period of from 1 day to 8 days after application to the root zone at a pH of from 6.5 to 10 so that the roots of the plant absorbs the bicarbonate or carbon dioxide from the water over the period of from 1 day to 8 days after application to the root zone.

14. The method according to claim 1, wherein the slow-release, synergistic composition providing a slow release of bicarbonate to the water over a period of from 1 day to 21 days after application to the root zone at a pH of from 6.5 to 10 so that the roots of the plant absorbs the bicarbonate or carbon dioxide from the water over the period of from 1 day to 21 days after application to the root zone.

15. The method of claim 1, wherein the source of nitrogen further comprises at least one of a urea compound, ammonium sulfate, and ammonium nitrate.

16. The method of claim 1, wherein the source of nitrogen further comprises at least one of urea ammonium nitrate (UAN), monoammonium phosphate (MAP), and diammonium phosphate (DAP).

17. The method of claim 1, wherein the source of nitrogen further comprises at least one of urea, ureaform, urea formaldehyde, methylene urea, methylene diurea, ammonium bicarbonate, and dimethylenetriurea.

18. The method of claim 1, wherein the carbohydrate comprises at least one of a starch or a sugar.

19. The method of claim 18, wherein the starch is selected from the group consisting of corn starch, rice starch, wheat starch, tapioca starch, cassava starch, and potato starch.

20. The method of claim 18, wherein the sugar is selected from the group consisting of glucose, sucrose, fructose, maltose, galactose, and lactose.

21. The method of claim 18, wherein the sugar is corn syrup.

22. The method of claim 1, wherein an amount of the ammonium bicarbonate is 10-65 wt %.

23. The method of claim 1, wherein the slow-release, synergistic composition further comprising bio-degradable binders, lubricants, glidants, and antiadherents.

24. The method according to claim 1, wherein the amount of the urea is 2 to 55 wt. % and the amount of the ammonium bicarbonate is 10 to 65 wt. %.

25. The method according to claim 1, wherein the amount of the urea is 5 to 45 wt. % and the amount of the ammonium bicarbonate is 15 to 55 wt. %.

26. A method of increasing crop yield and increasing protein levels in a plant product formed from a plant, comprising the following steps:
testing soil for growing the plants to check for amounts of nutrients, secondary nutrients, and micronutrients;
applying a first fertilizer to the soil or water surface of flooded soil, in which is growing cultivated plants;
applying a slow-release, synergistic composition comprising:
a nitrogen source comprising a combination of 2 to 75 wt % urea and 10 to 85 wt % ammonium bicarbonate;
a carbohydrate in an amount of 1 to 35 wt %; and
at least one alkali bicarbonate in an amount of 10 to 80 wt % selected from the group consisting of potassium bicarbonate, sodium bicarbonate, or a mixture of potassium bicarbonate and sodium bicarbonate to a root zone of a plant, wherein the slow-release, synergistic composition is in a solid or semi-solid form, the root zone contains water and roots of the plant, and the wt % is based on the total weight of the slow-release, synergistic composition; and
the slow-release, synergistic composition providing a slow release of bicarbonate to the water at a pH of from 6.5 to 10 so that the roots of the plant absorb the bicarbonate or carbon dioxide from the water.

27. The method according to claim 26, wherein the amount of the urea is 5 to 45 wt. % and the amount of the ammonium bicarbonate is 15 to 55 wt. %.

28. The method according to claim 26, wherein the amount of the urea is 2 to 55 wt. % and the amount of the ammonium bicarbonate is 10 to 65 wt. %.

29. The method of claim 26, wherein the first fertilizer comprises at least one source of nitrogen selected from the group consisting of urea, ammonia, ammonium nitrate, ammonium sulfate, calcium nitrate, diammonium phosphate, monoammonium phosphate, potassium nitrate, urea-ammonium nitrate (UAN), ammonium bicarbonate, and sodium nitrate;
a phosphorus compound selected from the group consisting of diammonium phosphate, monoammonium phosphate, monopotassium phosphate, dipotassium phosphate, tetrapotassium pyrophosphate, triple super phosphate, super phosphate, and potassium metaphosphate; and
a potassium compound selected from the group consisting of potassium chloride, potassium nitrate, potassium sulfate, monopotassium phosphate, dipotassium phosphate, tetrapotassium pyrophosphate, potassium bicarbonate, and potassium metaphosphate.

30. The method of claim 26, wherein the first fertilizer further comprises a secondary nutrient and micronutrient selected from the group consisting of iron sulfate, iron oxides, chelated iron, zinc sulfate, iron nitrate, zinc oxide, chelated zinc, copper oxide, copper sulfate, copper nitrate, magnesium nitrate, magnesium sulfate, magnesium oxide, sodium borate, boric acid, manganese sulfate, manganese oxide, chelated manganese EDTA, calcium sulfate, selenium sulfate and selenium oxide.

31. The method of claim 26, wherein the slow-release, synergistic composition is in a form of a tablet or granule 0.15-5.10 cm in diameter.

32. The method of claim 26, wherein the slow-release, synergistic composition is a package 0.15-5.10 cm in diameter.

33. The method of claim 32, wherein the package is biodegradable.

34. The method according to claim 26, wherein the slow-release, synergistic composition providing a slow release of bicarbonate to the water over a period of from 1 day to 8 days after application to the root zone at a pH of from 6.5 to 10 so that the roots of the plant absorbs the bicarbonate or carbon dioxide from the water over the period of from 1 day to 8 days after application to the root zone.

35. The method according to claim 26, wherein the slow-release, synergistic composition providing a slow release of bicarbonate to the water over a period of from 1 day to 21 days after application to the root zone at a pH of from 6.5 to 10 so that the roots of the plant absorbs the bicarbonate or carbon dioxide from the water over the period of from 1 day to 21 days after application to the root zone.

\* \* \* \* \*